United States Patent
Antar et al.

(10) Patent No.: US 10,471,367 B1
(45) Date of Patent: *Nov. 12, 2019

(54) VAPOR COMPRESSION DESALINATION SYSTEM FOR SEAWATER

(71) Applicant: KING FAHD UNIVERSITY OF PETROLEUM AND MINERALS, Dhahran (SA)

(72) Inventors: Mohammad Abdelkarim Antar, Dhahran (SA); Saddam ElTayib Ajib Jaber, Dhahran (SA)

(73) Assignee: King Fahd University of Petroleum and Minerals, Dhahran (SA)

( * ) Notice: Subject to any disclaimer, the term of this patent is extended or adjusted under 35 U.S.C. 154(b) by 0 days.

This patent is subject to a terminal disclaimer.

(21) Appl. No.: 16/520,396

(22) Filed: Jul. 24, 2019

Related U.S. Application Data

(63) Continuation of application No. 15/888,373, filed on Feb. 5, 2018, now Pat. No. 10,399,003.

(51) Int. Cl.
| | |
|---|---|
| *B01D 1/26* | (2006.01) |
| *B01D 1/04* | (2006.01) |
| *C02F 1/04* | (2006.01) |
| *C02F 1/14* | (2006.01) |
| *B01D 1/28* | (2006.01) |
| *B01D 1/00* | (2006.01) |
| *B01D 1/30* | (2006.01) |
| *C02F 103/08* | (2006.01) |

(52) U.S. Cl.
CPC ............. *B01D 1/26* (2013.01); *B01D 1/0035* (2013.01); *B01D 1/04* (2013.01); *B01D 1/2884* (2013.01); *B01D 1/305* (2013.01); *C02F 1/041* (2013.01); *C02F 1/048* (2013.01); *C02F 1/14* (2013.01); *C02F 2103/08* (2013.01)

(58) Field of Classification Search
CPC .......... B01D 1/0035; B01D 1/04; B01D 1/26; B01D 1/305; B01D 1/2884; C02F 1/041; C02F 1/048; C02F 1/14
See application file for complete search history.

(56) References Cited

U.S. PATENT DOCUMENTS

| | | | |
|---|---|---|---|
| 8,863,547 B2 | 10/2014 | Enis et al. | |
| 2014/0048407 A1 | 2/2014 | Ophir | |

FOREIGN PATENT DOCUMENTS

| | | |
|---|---|---|
| CN | 102583857 A | 7/2012 |
| CN | 205501018 U | 8/2016 |
| GB | 2 443 802 A | 5/2008 |

*Primary Examiner* — Brian A McCaig
(74) *Attorney, Agent, or Firm* — Oblon, McClelland, Maier & Neustadt, L.L.P.

(57) ABSTRACT

A desalination system that includes a plurality of evaporators that are fluidly connected in series, a primary compressor that is fluidly connected to the evaporators to provide a compressed vapor to the evaporators to run the desalination system, and a secondary compressor that is arranged in parallel relative to the primary compressor, wherein the secondary compressor extracts a portion of vapor from a first evaporator and/or one intermediate evaporator in the series and delivers the vapor to the first evaporator. Various combinations of embodiments of the desalination system are provided.

11 Claims, 18 Drawing Sheets

VAPOR COMPRESSION DESALINATION SYSTEM FOR SEAWATER

CROSS-REFERENCE TO RELATED APPLICATIONS

The present application is a Continuation of Ser. No. 15/888,373, now allowed, having a filing date of Feb. 5, 2018.

STATEMENT OF FUNDING ACKNOWLEDGEMENT

The funding provided by King Fand University of Petroleum and Minerals is gratefully acknowledged.

BACKGROUND OF THE INVENTION

Technical Field

The present invention relates to a desalination system that includes a plurality of evaporators that are fluidly connected in series, a primary compressor to run the desalination system, and a secondary compressor that is arranged in parallel relative to the primary compressor.

Description of the Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Approximately 70% of earth is covered with water. About 97% of this amount is saline water and therefore cannot be directly consumed. The shortage of water in many places in the world due to an enormous rise in population and vast industrialization growth can only be achieved through desalinating seawater or other sources of saline water. Various methods and techniques have been investigated to economically desalinate seawater to produce freshwater for various residential and industrial applications.

Thermal desalination systems mimic the water cycle that happens in nature, i.e. evaporation and condensation to desalinate saline water; and the heat that is required for evaporation can be partially recovered during the condensation. Multi effect desalination (MED) systems are one type of desalination systems with many economical and technical advantages. In MED systems, seawater is heated to a top brine temperature that is limited to 60 or 65° C. to avoid scaling on the outside surface of heat exchanging tubes. Seawater is then sprayed on the hot surface of the heat exchanging tubes to evaporate seawater. The formed vapor is taken to the next effect, wherein the vapor is condensed and the latent heat of condensation is used to evaporate another portion of seawater. This process is continued until the last effect, wherein the formed vapor is either condensed in a downstream condenser (as in MED-TVC (MED-thermal vapor compression systems)) or extracted to the suction side of a compressor (as in MED-MVC (MED-mechanical vapor compression systems)) to be compressed to a high pressure and high temperature vapor to be used as a thermal source to run the MED in a subsequent cycle. A drive motor is needed to run the compressor of the MED-MVC systems. However, the MED-MVC systems are advantageous since they can be manufactured in compact sizes, particularly for remote areas where power plants or other sources of energy (e.g. boilers) do not exist.

A comparison between thermal vapor compression and mechanical vapor compression was separately investigated by Hamed et al. [Hamed, O. A., Zamamiri, A. M, Aly, S and Lior, N, "The thermal performance and exergy Analysis of thermal vapor compression desalination system," Energy convers. and Management, vol. 37, No. 4, pp. 379-387, 1996] and Al-Juwayhel et al. [Faisal Al-Juwayhel, Hisham El-Dessouky, Hisham Ettouney, "Analysis of single evaporator desalination systems combined with vapor compression heat pumps," Desalination, vol. 114, pp. 253-275, 1997]. Hamed et al. analyzed the performance of a 4-effect system and indicated that MED-TVC systems provide higher performance with respect to the second law of thermodynamics. Al-Juwayhel et al. considered a single effect system and concluded that the thermal vapor compression system has a higher performance when operated at a higher motive steam pressure. Both studies revealed that MVC systems provide a higher performance at lower boiling temperatures. Aybar et al. [Hikmet S. Aybar, "Analysis of a mechanical vapor compression desalination system," Desalination, vol. 142, pp. 143-150, 2002] reported a power consumption of about 11.47 kWh/ton of water for a MED-MVC system with tube length of 9 m. In a theoretical model by Aly et al. [N. H. Aly, A. K. El-fiqi, "Mechanical vapor compression desalination systems—a case study," Desalination, vol. 158, pp. 143-150, 2003], the production rate was related to the operating temperatures. In view of this study, a higher evaporator temperature results in a higher heat transfer coefficient.

El-Khatib et al. [K. M. El-Khatib, S. Abd El-Hamid, H. Eissa, and M. Khedr, "Transient model, simulation and control of a single-effect mechanical vapor compression (SEMVC) desalination system," Desalination, vol. 166, no. 1-3, pp. 157-165, 2004] considered a multi-input multi-output control of a single effect evaporation unit with mechanical vapor compression to characterize the dynamics of the system. A single effect mechanical vapor compression system was also investigated by Ettouney [H. Ettouney, "Design of single-effect mechanical vapor compression," Desalination, vol. 190, no. 1-3, pp. 1-15, 2006], wherein a model is developed and the parameters that affect the system performance is highlighted. Accordingly, the diameter and the length of the tubes of the evaporator, the boiling temperature of the brine, and the temperature difference between the boiling temperature of brine and saturated vapor temperature were among these parameters. A study by Mussati et al. [S. Mussati, N. Scenna, E. Tarifa, S. Franco, and J. a. Hernandez, "Optimization of the mechanical vapor compression (MVC) desalination process using mathematical programming," Desalin. Water Treat., vol. 5, no. 1-3, pp. 124-131, 2009] optimized the performance of single effect mechanical vapor compression system. According to this study, an increase in the water production rate increases the power consumption and the steam flow rate, whereas a decrease in the flow rate of the brine reduces the product cost. Al-Asfour et al. [Fuad N. Alasfour, Hassan K. Abdulrahim, "The effect of stage temperature drop on MVC thermal performance," Desalination, vol. 265, pp. 213-221, 2011] theoretically analyzed a MED-MVC system and reported that increasing brine temperature reduces the consumed power and volume flow rate. In addition, the feed to distillate (F/D) ratio and temperature drop that occurs in each evaporator was reduced after increasing the brine temperature. A zero-emission desalination system was investigated by Han et al. [D. Han, W. F. He, C. Yue, and W. H. Pu, "Study on desalination of zero-emission system based on mechanical vapor compression," *Appl. Energy*, 2016] for both a single-effect and a multi-effect MVC systems. Han et al. concluded that a higher compressor power is needed to increase the brine concentration due to the increase in boiling temperature and boiling point elevation.

Madani [A. A. Madani, "Economics of Desalination for Three Plant Sizes, *Desalination*" pp. 187-200, 1990] reported that MED-MVC systems are more economical for smaller scale applications (i.e. water demand of less than 100 $m^3$/day) and medium-scale applications (i.e. water demand of 100-200 $m^3$/day) desalination systems. El-Dessouky et al. [H. T. El•Dessouky, H. M. Ettouney and F. Al•Juwayhel, "Multiple Effect Evaporation-Vapor compression Desalination Processes," Trans Icheme., Vol 78, Part A. May 2000] theoretically studied various MED-MVC arrangements and reported that the parallel cross flow arrangements requires a lower power consumption and a higher heat transfer surface area. A MED-MVC desalination model has been developed by Kronenberg et al. [Gustavo Kronenberg, Fredi Lokiec, "Low-temperature distillation processes in single- and dual-purposa plants," *Desalination*, vol. 136, pp. 189-197, 2001] for single/dual purpose plants (water and power production) at low temperatures. They reported that the main factor to increase the production capacity of MED-MVC systems is to develop compressors that provide higher volumetric flow rates. In addition, increasing the number of evaporators increases the effective heat transfer area and thus reduces the average boiling point evaporation in the system. Bahar et al. [R. Bahar, M. N. a. Hawlader, L. S. Woei, "Performance evaluation of a mechanical vapor compression desalination system," *Desalination*, vol. 166, pp. 123-127, 2004] investigated experimentally a two-effect MED-MVC system to evaluate the performance under difference compressor speeds and feed recirculation rates. It was concluded that the brine concentration affects the distillate flow rate and has a minor effect on the performance ratio. They also reported that compressor speed affects the distillate flow rate as well as the performance ratio. Al-Sahali et al. [Mohammad Al-Sahali, Hisham Ettouney, "Developments in thermal desalination process: Design, energy, and costing aspects," *Desalination*, vol. 214, pp. 227-240, 2007] compared the MED-MVC systems with multistage flash (MSF) desalination systems, wherein MED-MVC systems were found to be highly competitive to the MSF in terms of production cost and performance. Ophir et al. [A. Ophir, A. Gendel, "Steam driven large multi effect MVC (SD MVC) desalination process for lower energy consumption and desalination costs," *Desalination*. vol. 205, pp. 224-230, 2007] studied the MED with a turbo-compressor that is operated at a low temperature. According to Ophir et al., a thermo-compressor that has a lower efficiency than a turbo-compressor resulted in considerably lower energy consumptions, and therefore the desalination cost was substantially lower. Cardona et al. [E. Cardona, A. Piacentino, F. Marchese, "Performance evaluation of CHP hybrid seawater desalination plants," *Desalination* vol. 205, pp. 1-14, 2007] analyzed the performance of dual desalination systems (MED-SWRO) using a reciprocated engine with heat recovery to run the system. It supplies power and heat for RO and MED units, respectively. The (MED-SWRO) system was simulated and the environmental, energetic and economical results were calculated and compared with parallel RO systems. Producing the same freshwater flow rate, 30% decrease in $CO_2$ emissions and 8% decrease in unit cost of freshwater were reported. Nafey et al. [A. S. Nafey, H. E. S. Fath, A. A. Mabrouk, "Thermo-economic design of a multi-effect evaporation mechanical vapor compression (MEE-MVC) desalination process" *Desalination* vol. 230, pp. 1-15, 2008] considered thermo-economic design for MED-MVC desalination processes, at normal operating conditions with and without the presence of an external steam. It was found that the performance ratio of the system with an external steam is 8% less than that of the system that is operated at normal operations without an external steam. The results also revealed that reducing the pressure ratio of the vapor compressor from 1.35 to 1.15 at normal operation, reduces the power consumption by about 50%, wherein the unit product costs reduced from 1.7 to 1.24 \$/$m^3$. Wu et al. [H. Wu, Y. Li, and J. Chen, "Analysis of an evaporator-condenser-separated mechanical vapor compression system," *J. Therm. Sci.*, vol. 22, no. 2, pp. 152-158, 2013] conducted an experimental study on a MED-MVC system, wherein the condenser is separated from the evaporator by a rotating disk evaporator. The separated evaporator is designed to provide enhanced heat transfer, anti-scaling, and descaling. The performance was studied under various values of evaporating temperature and compressor frequency. It was found that the main parameters that affect the performance are pressure, evaporating temperature, flow rate of the vapor in the compressor, and the temperature difference as a function of the compressor frequency. They also reported that the coefficient of performance increases with rising the evaporating temperature. Shen et al. [J. Shen, Z. Xing, K. Zhang, Z. He, and X. Wang, "Development of a water-injected twin-screw compressor for mechanical vapor compression desalination systems," *Appl. Therm. Eng.*, vol. 95, pp. 125-135, 2016] conducted an experimental study on a water-injected mechanical vapor compression desalination system. The experimental results showed that the water injection and the velocity of the compressor had a major effect on the performance of the system, while the effect of the inlet temperature of the compressor was relatively small. Further, it was stated that the power consumption of the compressor increases with the compressor speed, and the compressor inlet temperature only affects the power consumption of the compressor.

A number of designs of multi-effect desalination systems have been patented. Thomas Sherwood (U.S. Pat. No. 3,261,766) proposed integrating a MED or a MSF system with an absorber and a generator to produce more vapor through the use of hygroscopic liquid such as lithium bromide. Paul L Geiringer (U.S. Pat. No. 3,489,654) proposed using a jet compressor with MED systems. Motive steam can also be used to run a turbine for power production with motive fluid for the thermo-vapor compressor using water or steam from an external source. Praschak (U.S. patent application 2007/0204963) proposed a MED system where heating the first effect is achieved by a jet wet washer with a superheated, air-containing waste steam. Vapor formed in the first evaporator enters into a compressor and an external steam source, e.g. a waste steam, is needed for the first evaporator. Koistinen and Tikka (WO 2009/053518) proposed a system to use mechanical vapor compression to pre-evaporate black liquor of a chemical pulp mill through the use of a fan or compressor to raise the vapor pressure and temperature. Holtzapple, Noyes (WO 2005078371) patented a MED system with a single compressor that receives vapor from the last effect and compresses it to a high pressure and a high temperature to use it as a heat source for feeding the first effect. The system includes a turbine to run the compressor and a pump to drive cooling liquid to the compressor.

In view of the forgoing, one objective of the present invention is to provide a desalination system that includes a plurality of evaporators that are fluidly connected in series, a primary compressor that is fluidly connected to the evaporators to provide a compressed vapor to the evaporators to run the desalination system, and a secondary compressor that is arranged in parallel relative to the primary compressor, wherein the secondary compressor extracts a portion of vapor from a first evaporator and/or at least one intermediate evaporator in the series and delivers the vapor to the first evaporator.

BRIEF SUMMARY OF THE INVENTION

According to a first aspect, the present disclosure relates to a desalination system, including i) a plurality of evaporators that are fluidly connected in series, wherein each evaporator comprises a) a tube with a tube inlet and a tube outlet, wherein at least a portion of the tube is located in an interior of the evaporator, b) a saline water inlet to deliver a saline water to the interior of the evaporator, wherein the saline water is contacted with the tube thereby forming water condensate inside the tube and concurrently forming vapor and brine in the interior of the evaporator, c) a vapor outlet to reject the vapor from the interior of the evaporator, d) a brine outlet to reject the brine from the interior of the evaporator, e) a vapor line that fluidly connects the vapor outlet to the tube inlet of a subsequent evaporator or a compressor, ii) a saline water line that is fluidly connected to the saline water inlet of at least one evaporator, wherein the saline water line delivers the saline water to the saline water inlet, iii) a distillate line that is fluidly connected to the tube outlet of at least one evaporator, wherein the distillate line delivers the water condensate to a downstream unit, iv) a primary compressor that is fluidly connected to the vapor outlet of a last evaporator in the series and the tube inlet of a first evaporator in the series, wherein the primary compressor compresses a vapor from the interior of the last evaporator and delivers the vapor to the tube of the first evaporator, v) a secondary compressor that is fluidly connected to the vapor outlet of the first evaporator and/or the vapor outlet of at least one intermediate evaporator in the series and the tube inlet of the first evaporator, wherein the secondary compressor compresses a vapor from the interior of the first evaporator and/or the at least one intermediate evaporator and delivers the vapor to the tube of the first evaporator.

In one embodiment, the secondary compressor is fluidly connected to the vapor outlet of the first evaporator and the vapor outlet of the at least one intermediate evaporator and the tube inlet of the first evaporator.

In one embodiment, the secondary compressor is fluidly connected to the vapor outlet of the first evaporator and the tube inlet of the first evaporator.

In one embodiment, the secondary compressor is fluidly connected to the vapor outlet of an intermediate evaporator and the tube inlet of the first evaporator.

In one embodiment, the primary compressor and the secondary compressor are fluidly connected to the tube inlet of the first evaporator in parallel.

In one embodiment, a pressure ratio of the secondary compressor is in the range of 1.1 to 3.

In one embodiment, the desalination system includes 3 to 12 evaporators.

In one embodiment, each evaporator further includes a demister to remove water droplets from the vapor that is rejected from the interior of the evaporator.

In one embodiment, the portion of the tube that is located in the interior of the evaporator has a coil shape.

In one embodiment, the desalination system further includes a brine line that is fluidly connected to the brine outlet of at least one evaporator, wherein the brine line discharges the brine.

In one embodiment, the evaporators are fluidly connected in series with a parallel feed configuration.

In one embodiment, the evaporators are fluidly connected in series with a parallel/cross feed configuration.

In one embodiment, the evaporators are fluidly connected in series with a forward feed configuration.

In one embodiment, the desalination system further includes a first heat exchanger that is located on the distillate line and the saline water line, wherein the first heat exchanger transfers heat from the water condensate to the saline water.

In one embodiment, the desalination system further includes a second heat exchanger that is located on the brine line and the saline water line, wherein the second heat exchanger transfers heat from the brine to the saline water.

In one embodiment, a temperature of the saline water is no more than 80° C.

In one embodiment, the primary and/or the secondary compressors are powered by solar energy.

In one embodiment, the desalination system does not include a condenser.

In one embodiment, an extraction ratio of the secondary compressor ranges from 0.05 to 0.95, wherein a specific power consumption of the desalination system ranges from 4.0 to 16 kWh per one cubic meter of the water condensate formed.

In one embodiment, an extraction ratio of the secondary compressor ranges from 0.05 to 0.95, wherein an exergy efficiency of the desalination system ranges from 75% to 95%.

In one embodiment, the plurality of evaporators that are fluidly connected in series is defined by N, and the secondary compressor is fluidly connected to the vapor outlet of an evaporator that is defined by N/2 and the tube inlet of the first evaporator.

In one embodiment, the desalination system has a specific heat transfer area that is substantially the same as the specific heat transfer area of a desalination system that does not include the secondary compressor.

In one embodiment, a ratio of an exergy efficiency of the desalination system to an exergy efficiency of a desalination system that does not include a secondary compressor is in the range of 1.1:1 to 1.8:1.

The foregoing paragraphs have been provided by way of general introduction, and are not intended to limit the scope of the following claims. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DETAILED DESCRIPTION OF THE EMBODIMENTS

Figure 1A:
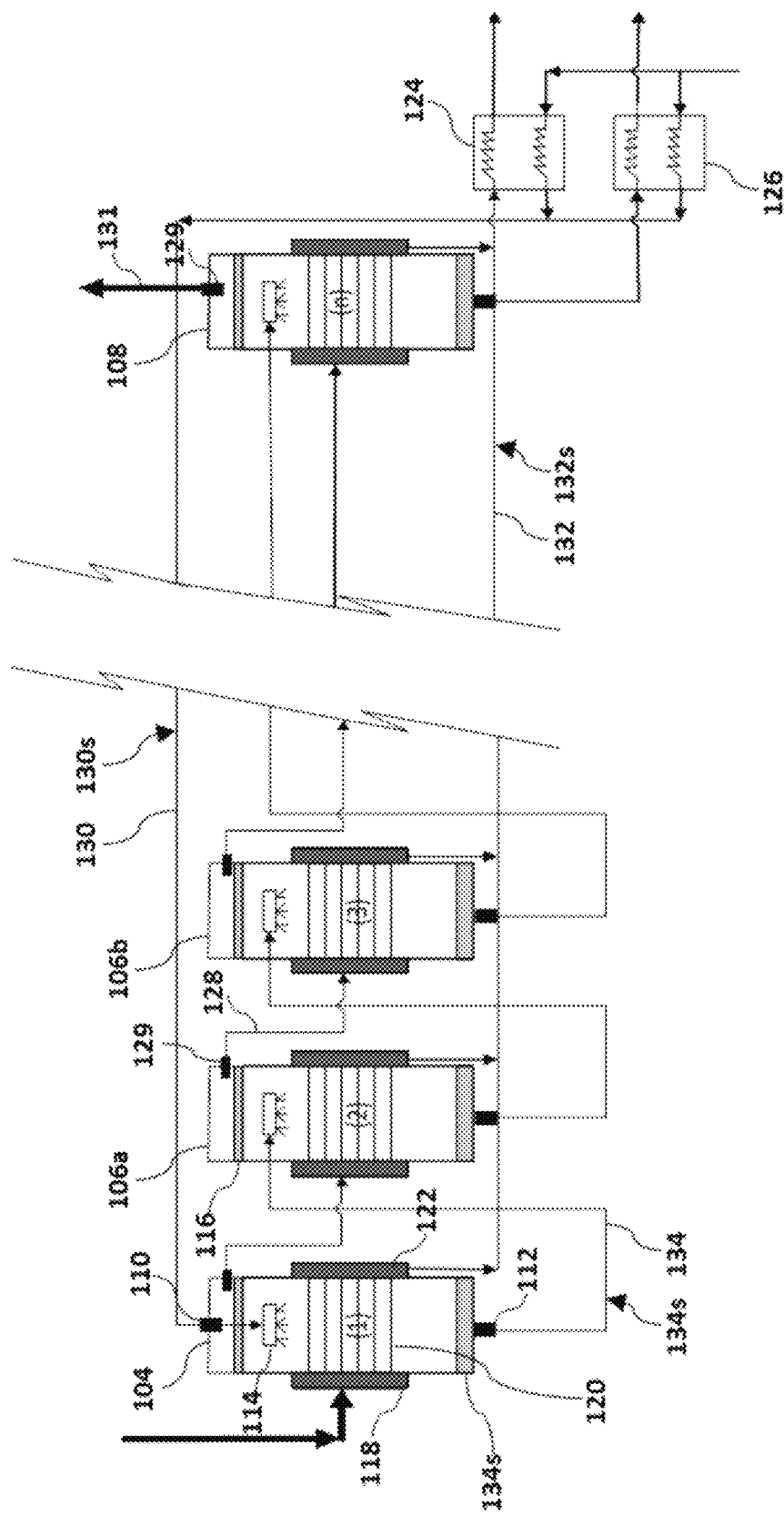
FIG. 1A illustrates a plurality of evaporators that are fluidly connected in series, which is powered by steam provided from an upstream unit.

Referring now to the drawings, wherein like reference numerals designate identical or corresponding parts throughout the several views.

The present disclosure will be better understood with reference to the following definitions. As used herein, the words "a" and "an" and the like carry the meaning of "one or more." Within the description of this disclosure, where a numerical limit or range is stated, the endpoints are included unless stated otherwise. Also, all values and subranges within a numerical limit or range are specifically included as if explicitly written out.

As used in this disclosure, the term "proximal to a bottom of an evaporator" refers to a region of the evaporator that is located less than 20%, preferably less than 15%, preferably less than 10% of the total height of the evaporator, when measured from the bottom of the evaporator, with 0% being the bottom and 100% being the top of the evaporator. Alternatively, the term "proximal to a top of the evaporator" as used herein refers to a region of the evaporator that is located less than 20% of the total height of the evaporator, when measured from the top of the evaporator, with 0% being the top and 100% being the bottom of the evaporator.

As used in this disclosure, the term "suction side" of a compressor is intended to refer to an inlet of the compressor, through which a vapor enters the compressor. Alternatively, the "discharge side" of a compressor refers to an outlet of the compressor, through which a compressed vapor exits the compressor.

Also, in terms of the present disclosure, the term "substantially the same" refers to a condition wherein a difference between two quantities are no more than 5%, preferably no more than 2%, preferably no more than 1% relative to the smaller value of the two quantities.

According to a first aspect, the present disclosure relates to a desalination system 100 (see FIG. 1B-1H). The term "desalination system" as used in this disclosure relates to a set of equipment that are fluidly connected and for desalinating saline water, e.g. seawater. The desalination system 100 includes a plurality of evaporators (or effects) that are fluidly connected in series, wherein said evaporators produce water condensate (or desalinated water) from saline water, brackish water, seawater, or brine. The desalination system 100 of the present disclosure is operated by a primary compressor 102, which may be solar powered, electrically powered (e.g. by an electric motor connected to a generator), and/or mechanically powered (e.g. by a diesel engine or wind turbines). As used herein, the term "evaporator" and the term "effect" are identical and may be used interchangeably throughout this disclosure.

In terms of the present disclosure, the term "saline water" is used as a general term for any water than contains more salinity than water condensate, which contains less than 0.06% by weight, preferably less than 0.05% by weight, relative to the total solution weight. Accordingly, the term "saline water" may refer to brackish water, seawater, or brine, whereas the term "water condensate" may refer to water distillate, desalinated water, or freshwater. As used herein, "brackish water" contains 0.06-3% by weight of dissolved salts, "seawater" contains 3-5% by weight of dissolved salts, and "brine" contains greater than 5% by weight of dissolved salts (as presented herein % by weight is relative to the total solution weight). Salts that may be present in the saline water that may be removed using the desalination system 100 of the present disclosure may be, but are not limited to, cations such as sodium, magnesium, calcium, potassium, ammonium, and iron, and anions such as chloride, bicarbonate, carbonate, sulfate, sulfite, phosphate, iodide, nitrate, acetate, citrate, fluoride, and nitrite.

The desalination system 100 of the present disclosure is preferably a multi-effect desalination (MED) system that is operated by a compressor. Such system may also be referred to as a MED-MVC system (i.e. a multi-effect desalination mechanical vapor compression system). The desalination system 100 of this disclosure is a MED-MVC system that includes at least a plurality of evaporators that are fluidly connected in series, a primary compressor 102 to run the desalination system, and a secondary compressor 103 (as shown in FIGS. 1E, 1F, 1G, and 1H).

Figure 1B:
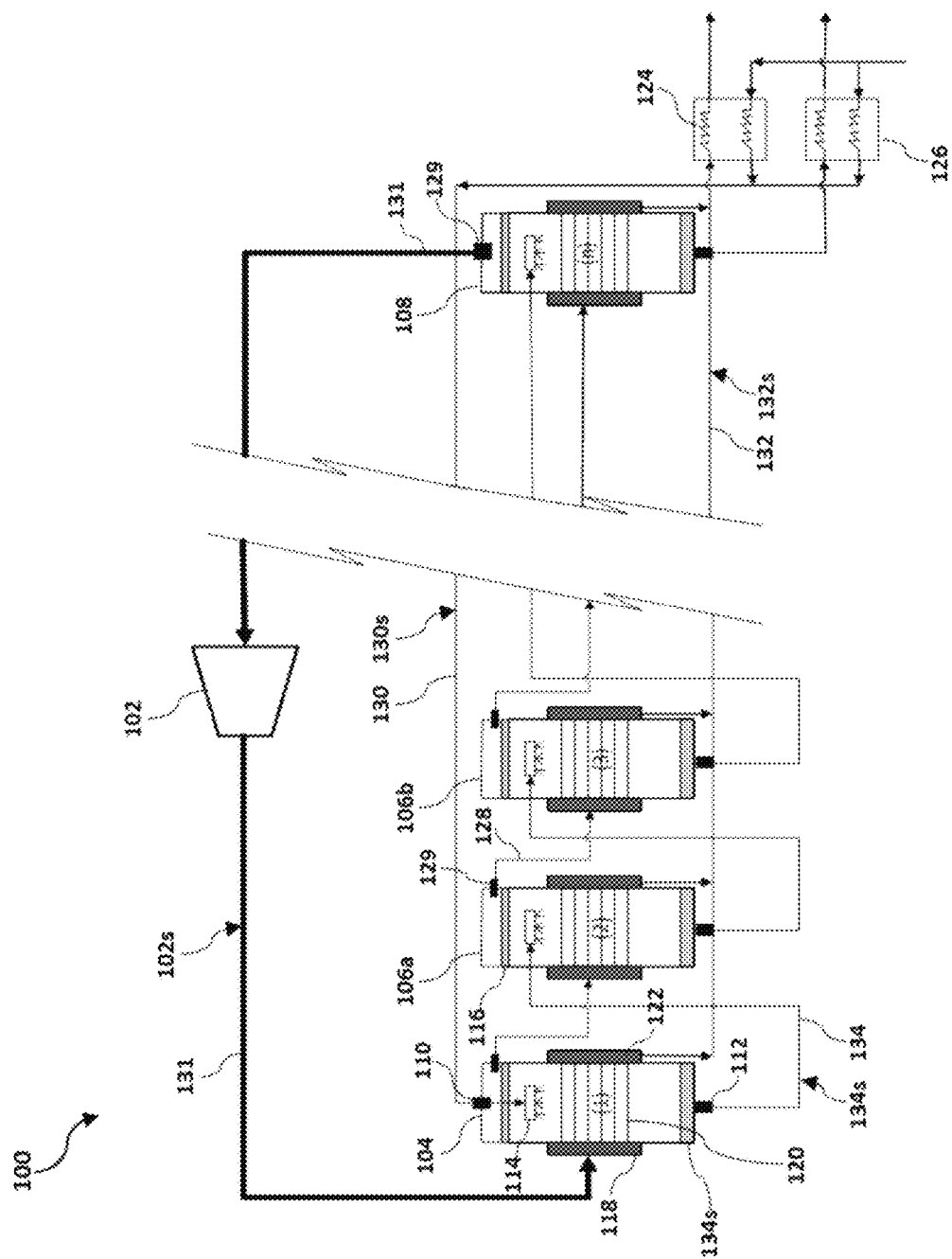
FIG. 1B illustrates a desalination system with a primary compressor and a plurality of evaporators that are fluidly connected in series with a forward feed configuration.

Each evaporator (or effect) includes a tube 120 with a tube inlet and a tube outlet, wherein at least a portion of the tube 120 is located in an interior of the evaporator, and the tube inlet and the tube outlet are preferably located outside of the interior of the evaporator. In the evaporators, heat exchanging phenomena may generally happen on a surface of the tube 120, and therefore one way of increasing a vapor production of each evaporator is to increase a surface area of the tube 120. In view of that, in a preferred embodiment, the portion of the tube that is located in the interior of the evaporator has a coil shape to provide an extended contacting surface area. Alternatively, in some preferred embodiments, each evaporator has a shell-and-tube structure. Accordingly, a plurality of substantially parallel tubes 120 (or tube bundles) may be disposed inside the evaporators with a plurality of tube inlets with an inlet plenum 118, and a plurality of tube outlets with an outlet plenum 122, as shown in FIGS. 1A and 1B. The inlet plenum 118 is utilized to distribute the vapor to the tube inlets, and the outlet plenum 122 is used to collect water condensate 132$s$ from the tube outlets. The tubes 120 may preferably be arranged horizontally, as shown in FIGS. 1A and 1B, while in some embodiments, the tubes may be vertically arranged, or arranged in vertically stacked bundles. The structure and the arrangement of the tubes are not meant to be limiting and various structures and arrangements may alternatively be used, as known to those skilled in the art.

Figure 1C:
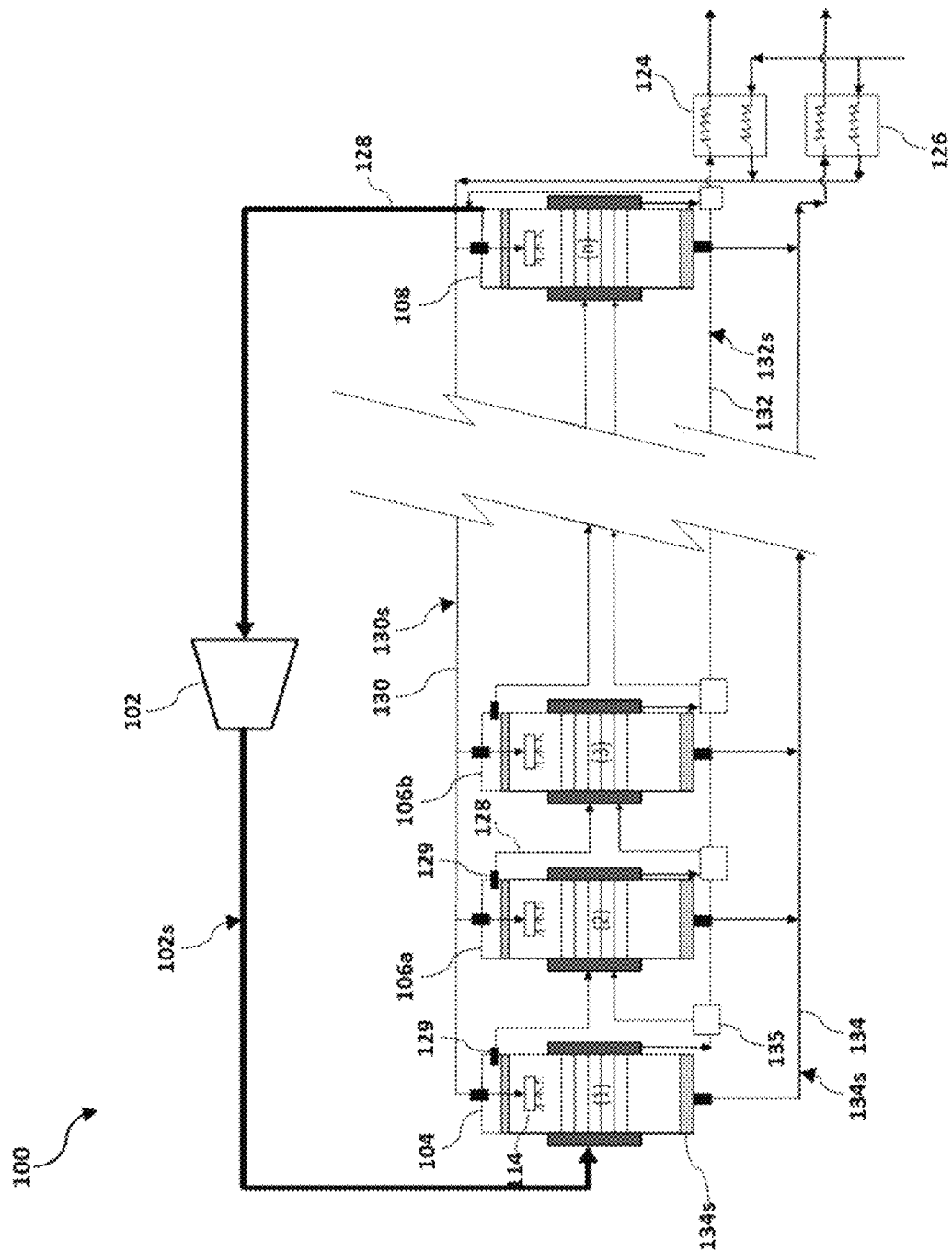
FIG. 1C illustrates a desalination system with a primary compressor and a plurality of evaporators that are fluidly connected in series with a parallel feed configuration.

In addition, each evaporator of the desalination system further includes a saline water inlet 110 to deliver the saline water 130$s$ to the interior of the evaporator. Preferably, the saline water is supplied with a saline water line 130. In some preferred embodiments, a water sprayer 114 may be located at the saline water inlet 110 to spray/sprinkle the saline water 130$s$ into the interior of the evaporator (as shown in FIGS. 1A, 1B, and 1C). The presence of the water sprayer 114 may be advantageous, since it may provide an increased contacting surface area of the saline water 130$s$ with the tube 120. The water sprayer 114 may be made of glass, quartz, alumina, Pyrex®, or a metal selected from the group consisting of stainless steel, nickel steel, chromium steel, aluminum, aluminum alloy, copper and copper alloys, titanium, and the like. In the embodiments where the water sprayer 114 is made with a metal, the water sprayer 114 may be coated with a polymeric material, e.g. epoxy, polyurethane, etc. to prevent rusting and corrosion. The water sprayer 114 may be a perforated disc, like a shower head, or a perforated hollow cylinder with perforations that are circumferentially adjusted on the surface of the perforated hollow cylinder. In some embodiments, perforated trays may be used in lieu of the water sprayers 114. The type of material and the structure of the water sprayer 114 or the perforated trays are not meant to be limiting and various types of the water sprayer or the perforated trays may be utilized.

When the saline water 130$s$ is contacted with the tube of the first evaporator 104, a heat exchanging phenomenon takes place, wherein a portion of compressed vapor 102$s$ that flows inside the tube of the first evaporator 104 is condensed and releases a latent heat of condensation, and thus water condensate is formed in the tube (or tubes). On the other hand, a portion of the saline water 130$s$ that is sprayed into the interior of the first evaporator 104 absorbs the latent heat of condensation and evaporates, thereby forming vapor in the interior of the first evaporator 104. As used herein, the term "compressed vapor" refers to a vapor that is supplied to the tube of the first evaporator 104 with the primary compressor 102.

Said heat exchanging phenomenon may also take place in subsequent evaporators downstream of the first evaporator 104 (i.e. intermediate evaporators 106$a$, 106$b$, and a last evaporator 108). As a result, water condensate is formed in the tube of the subsequent evaporators and vapor is concurrently formed in the interior of the subsequent evaporators.

The vapor that is formed in the interior of the first evaporator 104 is further delivered to the subsequent evaporator (i.e. the evaporator 106$a$) via a vapor outlet 129 and a vapor line 128. The "vapor outlet" refers to an opening that is adjusted proximal to the top of each evaporator for rejecting vapor that is formed in the evaporator. The "vapor line" is a canal that fluidly connects the vapor outlet 129 of each evaporator to the tube inlet of a subsequent evaporator or a compressor.

The term "last evaporator" as used in this disclosure refers to the last evaporator of the series (i.e. the evaporator 108) that is located preferably directly upstream of the primary compressor 102 (as shown in FIGS. 1B, 1C, 1D, 1E, 1F, 1G, and 1H). In addition, the term "intermediate evaporator" as used in this disclosure refers to one or more evaporators of the series that are located downstream of the first evaporator 104 and upstream of the last evaporator 108. The term "subsequent evaporator" as used in this disclosure refers to an evaporator that is located downstream of and directly adjacent to another evaporator. Similarly, the term "preceding evaporator" as used in this disclosure refers to an evaporator that is located upstream of and directly adjacent to another evaporator.

The water condensate 132$s$ that is formed in the tube may be pumped out of the desalination system 100 via a distillate line 132. The "distillate line" refers to a canal that is fluidly connected to the tube outlet (or outlet plenum 122) of each of the evaporators. The distillate line 132 may deliver the water condensate 132$s$ to a downstream unit, which may be an industrial water treatment plant and/or a residential water treatment plant, wherein the water condensate 132$s$ may be further processed to be utilized for drinking, or may be used in air conditioning or refrigerating systems in residential or industrial applications. In some embodiments, the water condensate 132$s$ may be utilized as distilled water for various chemical reactions or other applications known to those skilled in the art, e.g. in cement plants, chemical and petrochemical plants, oil refineries, mineral processing plants, methanol plants, LNG plants, sugar refineries, power plants, mining applications, etc.

The water condensate 132s that flows inside the distillate line 132 may have a temperature in the range of 30 to 90° C., preferably 35 to 80° C., preferably 40 to 65° C. In view of that, in some embodiments, the saline water 130s that flows in the saline water line 130 may be pre-heated by the water condensate 132s using a first heat exchanger 124 (as shown in FIGS. 1A, 1B, 1C, 1D, 1E, 1F, 1G, and 1H). Accordingly, the first heat exchanger 124 is located on the distillate line 132 and the saline water line 130, wherein the first heat exchanger 124 transfers heat from the water condensate 132s to the saline water 130s. For instance, in one embodiment, the saline water 130s may have a temperature of approximately 10 to 60° C., preferably 20 to 55° C., preferably 30 to 50° C. before entering the first heat exchanger 124, while it may have a temperature of approximately 25 to 65° C., preferably 35 to 60° C., preferably 40 to 55° C. after leaving the first heat exchanger 124. Pre-heating the saline water 130s may reduce a total power consumption (in kWh) of the desalination system 100 by at least 20%, preferably at least 30%, preferably at least 50%, relative to the total power consumption of the desalination system 100 that does not include the first heat exchanger 124. The term "total power consumption" as used herein refers to the total amount of the power that is consumed in the primary compressor 102 and the secondary compressor 103.

In some embodiments, a portion of the water condensate 132s may be evaporated in a flash box 135, and the resulting vapor may be delivered to the tube inlet (or inlet plenum 118) of the subsequent evaporator along with the vapor that is formed in the interior of the first evaporator 104 (or any preceding evaporator). One or more flash boxes may be utilized in the desalination system 100. Preferably, one flash box 135 may be utilized per each evaporator (as depicted in FIGS. 1C, 1D, 1F, 1G, and 1H). As used herein, the flash box 135 is a vacuum chamber that is located on the distillate line 132 and is operated in a sub-atmospheric pressure (e.g. a pressure below 1.0 atm, preferably below 0.9 atm), wherein a portion of the water condensate 132s is flashed, preferably without heating and at the sub-atmospheric pressure. The flash box 135 may be rectangular, cylindrical, pyramidal, oblong, conical, or preferably spherical. The type of material and the structure of the flash box 135 are not meant to be limiting and various types of the flash boxes may be utilized.

Each evaporator of the desalination system 100 may further include a brine outlet 112 to reject brine 134s from the interior of the evaporator. The brine outlet 112 may be adjusted proximal to the bottom of each evaporator, since the brine 134s is accumulated proximal to the bottom of the evaporator. Additionally, the desalination system 100 further includes a brine line 134 that is fluidly connected to the brine outlet 112 of at least one evaporator, wherein the brine line 134 discharges the brine 134s. The brine 134s that flows inside the brine line 134 may have a temperature in the range of 25 to 85° C., preferably 30 to 75° C., preferably 35 to 65° C. In view of that, in some embodiments, the saline water 130s that flows in the saline water line 130 may be pre-heated with the brine 134s using a second heat exchanger 126. Accordingly, the second heat exchanger 126 is located on the brine line 134 and the saline water line 130, wherein the second heat exchanger 126 transfers heat from the brine 134s to the saline water 130s. In one embodiment, the saline water 130s may have a temperature of approximately 10 to 40° C., preferably 15 to 30° C., preferably 20 to 25° C. before entering the second heat exchanger 126, while it may have a temperature of approximately 25 to 65° C., preferably 35 to 60° C., preferably 30 to 50° C. after leaving the second heat exchanger 126. Pre-heating the saline water 130s may reduce the total power consumption (in kWh) of the desalination system 100 by at least 20%, preferably at least 30%, preferably at least 50%, relative to the total power consumption of the desalination system 100 that does not include the second heat exchanger 126.

The first and the second heat exchangers may be located in a series arrangement on the saline water line 130. Alternatively, the first and the second heat exchangers may be located in a parallel arrangement on the saline water line 130, as shown in FIGS. 1A, 1B, 1C, 1D, 1E, 1F, 1G, and 1H.

In one embodiment, each evaporator further includes a demister 116 that is located proximal to the top of the evaporator, wherein the demister 116 is used to remove water droplets that are entrained in the vapor that is rejected from the interior of the evaporator.

A composition of the compressed vapor 102s that is delivered to the tube of the first evaporator 104 may be substantially the same as the vapor that is delivered to the tube of the subsequent evaporators. Depending on the type of the primary compressor 102, a temperature and a pressure of the compressed vapor 102s is at least 10%, preferably at least 20%, preferably at least 30%, preferably at least 50%, preferably at least 70%, preferably at least 80%, preferably at least 100% higher than the temperature and the pressure of the vapor that is produced in the interior of each evaporator. For example, in one embodiment, the compressed vapor 102s has a temperature of 80 to 200° C., preferably 100 to 180° C., preferably 120 to 150° C., whereas a temperature of the vapor that is formed in the interior of the first evaporator 104 or any of the intermediate evaporators (i.e. 106a, 106b, . . . ) or the last evaporator 108 is no more than 120° C., preferably no more than 110° C., preferably no more than 100° C. Also, in another embodiment, a pressure of the compressed vapor 102s is in the range of 1.2 to 10 bars, preferably 1.5 to 8.0 bars, preferably 2.0 to 5.0 bars, whereas a pressure of the vapor that is formed in the interior of the first evaporator 104 or any of the intermediate evaporators (i.e. 106a, 106b, . . . ) or the last evaporator 108 is less than 1.1 bars, preferably less than 1.0 bar, preferably less than 0.9 bars, preferably less than 0.8 bars.

The desalination system 100 may include at least 2 evaporators. In a preferred embodiment, the desalination system 100 includes 3 to 12, preferably 4 to 10. Irrespective of the number of evaporators that are used, an internal pressure of the evaporators may decrease from the first evaporator 104 towards the last evaporator 108. In some embodiments, an internal volume of the evaporators may decrease from the first evaporator 104 towards the last evaporator 108. For example, in some preferred embodiments, the internal pressure of the first evaporator 104 may be in the range of 0.7 to 1.0 bars, preferably 0.8 to 0.9 bars, wherein the internal pressure of the intermediate evaporators (i.e. 106a, 106b, . . . ) may be in the range of 0.5 to 0.8 bars, preferably 0.6 to 0.7 bars, and wherein the internal pressure of the last evaporator 108 may be in the range of 0.3 to 0.6, preferably 0.4 to 0.5 bars. In one embodiment, the internal pressure of each subsequent evaporator is about 2% to about 10%, preferably about 3% to about 9%, preferably about 4% to about 8% lower than the preceding evaporator.

In addition, the temperature of the vapor of the evaporators may decrease from the first evaporator 104 towards the last evaporator 108. For example, in some embodiments, the temperature of the vapor that forms in the first evaporator 104 may be in the range of 90 to 150° C., wherein the temperature of the vapor that forms in the intermediate evaporators (i.e. 106a, 106b, ... ) may be in the range of 60 to 110° C., and wherein the temperature of the vapor that forms in the last evaporator 108 may be in the range of 50 to 90° C. In one embodiment, the temperature of the vapor that forms in each subsequent evaporator is about 5% to about 20%, preferably about 6% to about 15%, preferably about 10% lower than the preceding evaporator. In a preferred embodiment, the temperature of vapor in the first evaporator 104 may be in the range of 75 to 90° C., and the temperature may be reduced to about 20 to 50° C., preferably 25 to 45° C., preferably about 40° C. in the last evaporator 108 depending on the seawater temperature. In some embodiments, the temperature of vapor in the last evaporator 108 may be less than 30° C.

Devices and equipment that are utilized in the desalination system 100, e.g. the evaporators, the lines, the tube, etc. are not meant to be limiting and various types of evaporators, lines, tubes, etc. may be used. For example, in one embodiment the tubes are made of carbon steel and are coated with epoxy. Alternatively, the tubes may be made of stainless steel, bronze, aluminum, titanium, poly vinyl chloride, etc.

Figure 1D:
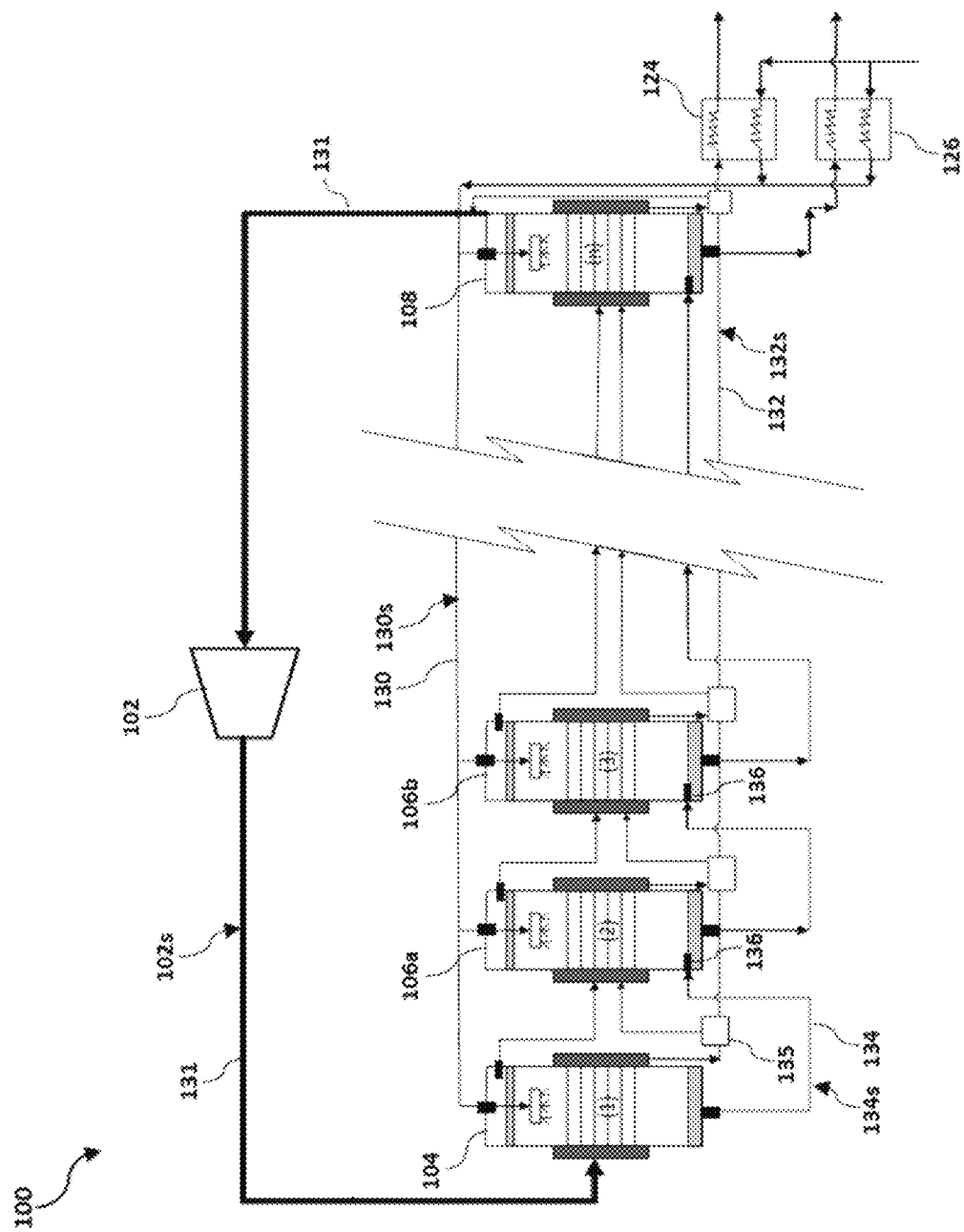
FIG. 1D illustrates a desalination system with a primary compressor and a plurality of evaporators that are fluidly connected in series with a parallel/cross feed configuration.
Figure 1E:
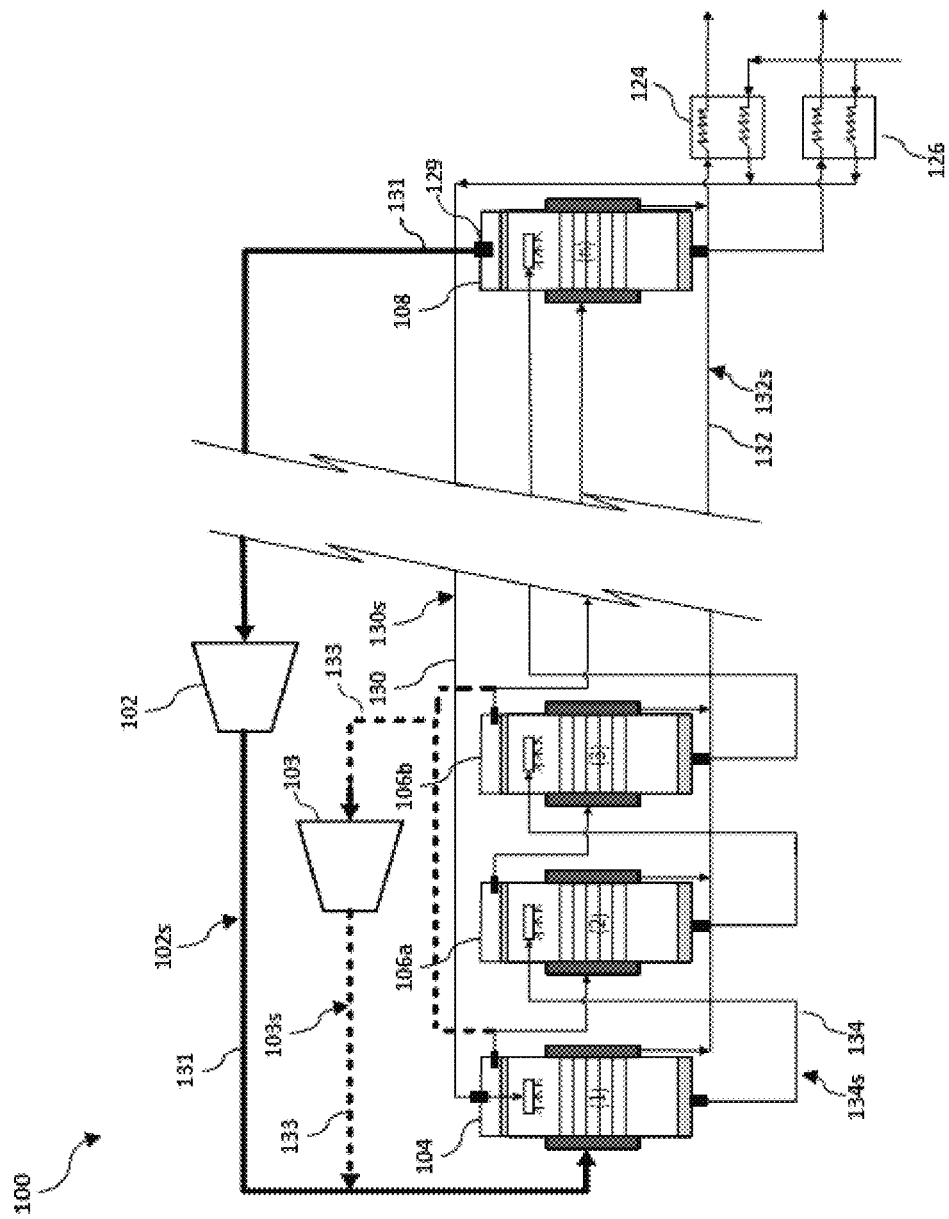
FIG. 1E illustrates a desalination system with a primary compressor, a secondary compressor, and a plurality of evaporators that are fluidly connected in series with a forward feed configuration.
Figure 3A:
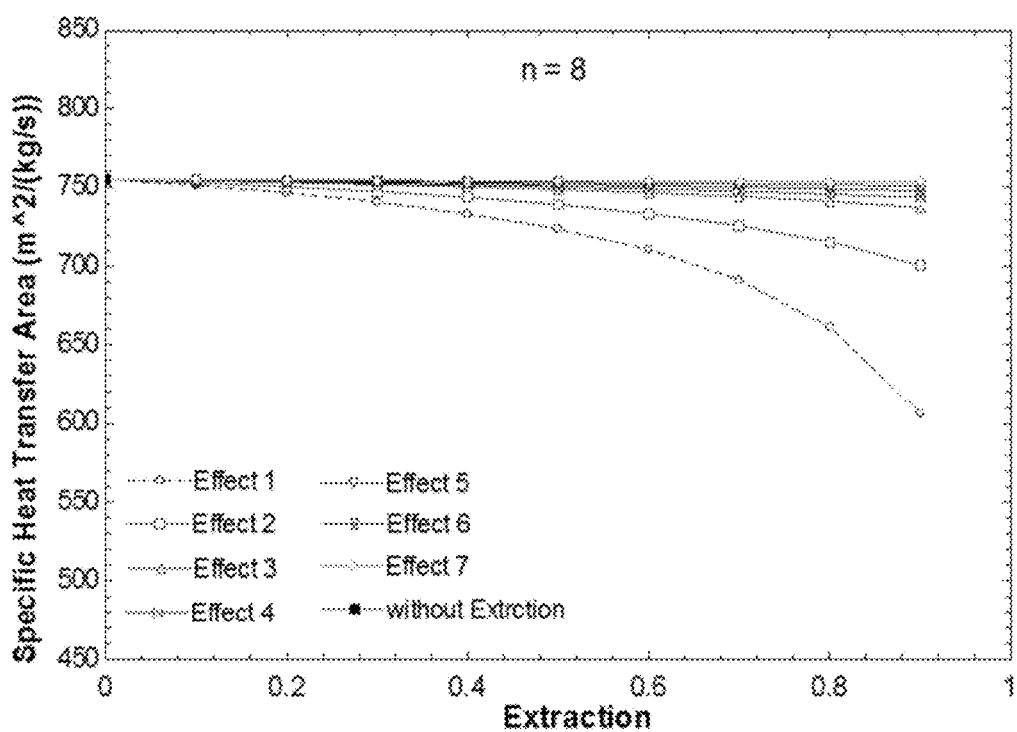
FIG. 3A represents a specific heat transfer area of a desalination system versus an extraction ratio of the secondary compressor, wherein the desalination system contains eight evaporators that are fluidly connected in series with a forward feed configuration.

In one embodiment, the evaporators are arranged in a forward feed configuration as shown in FIGS. 1B and 1E. Accordingly, the brine outlet 112 of each evaporator is fluidly connected to the saline water inlet 110 of the subsequent evaporator, wherein the brine 134s is delivered to the saline water inlet 110 of the subsequent evaporator. In view of that, a portion of the brine 134s is contacted with the tube of the subsequent evaporator, and thus an overall vapor production of each evaporator may increase. As a result, an overall efficiency of the desalination system 100 may be increased. In one embodiment, a specific heat transfer area of the desalination system 100 that includes eight evaporators that are fluidly connected in series with a forward feed configuration may vary in the range from about 400 m²/(kg/s) to about 900 m²/(kg/s), preferably about 600 m²/(kg/s) to about 800 m²/(kg/s), preferably about 700 m²/(kg/s) to about 780 m²/(kg/s), as shown in FIG. 3A. As used herein, the term "specific heat transfer area of a desalination system" refers to a ratio of the total surface area of the tubes of all evaporators of the desalination system to the mass flow rate of the water condensate that is produced.

Figure 1F:
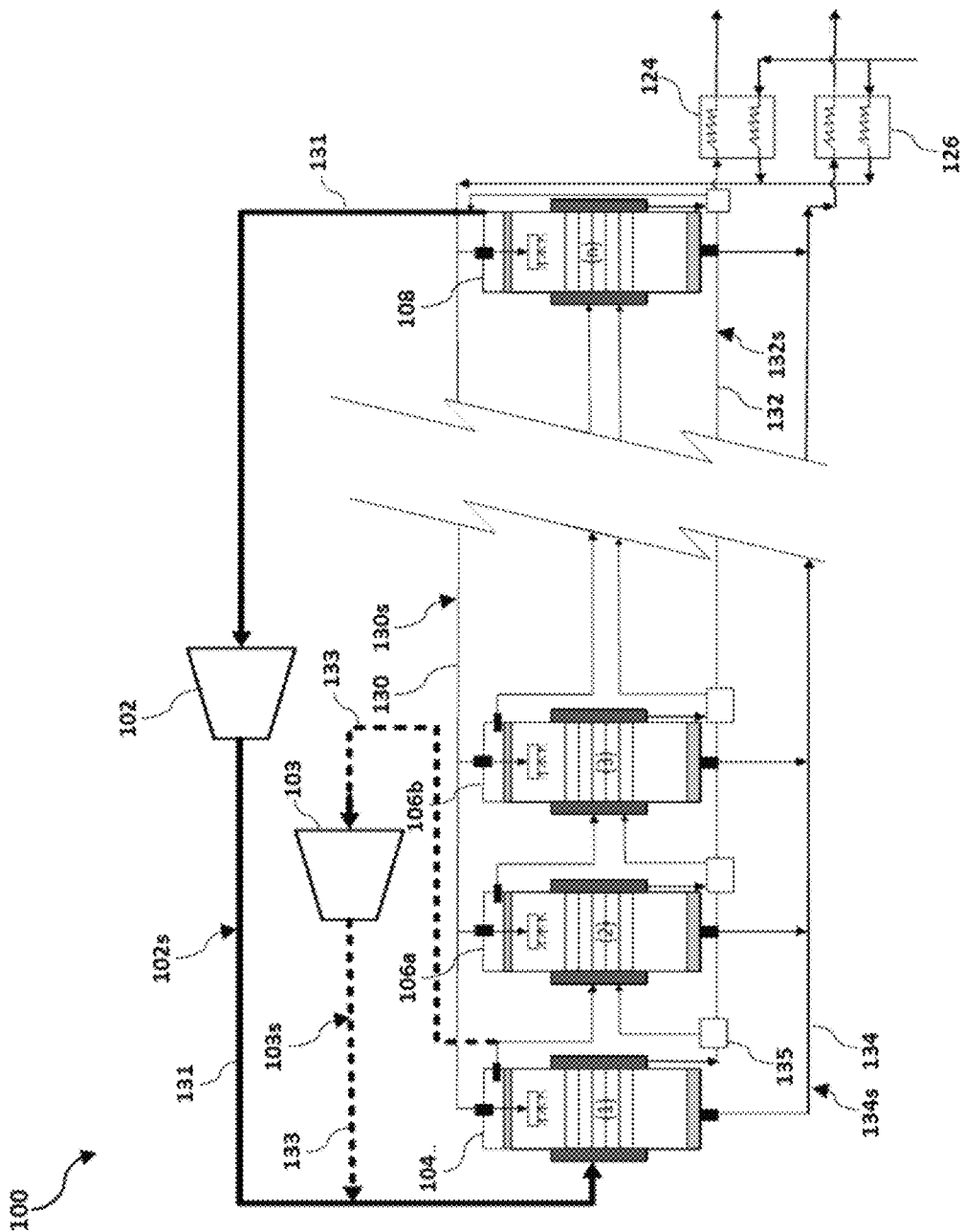
FIG. 1F illustrates a desalination system with a primary compressor, a secondary compressor, and a plurality of evaporators that are fluidly connected in series with a parallel feed configuration.
Figure 3B:
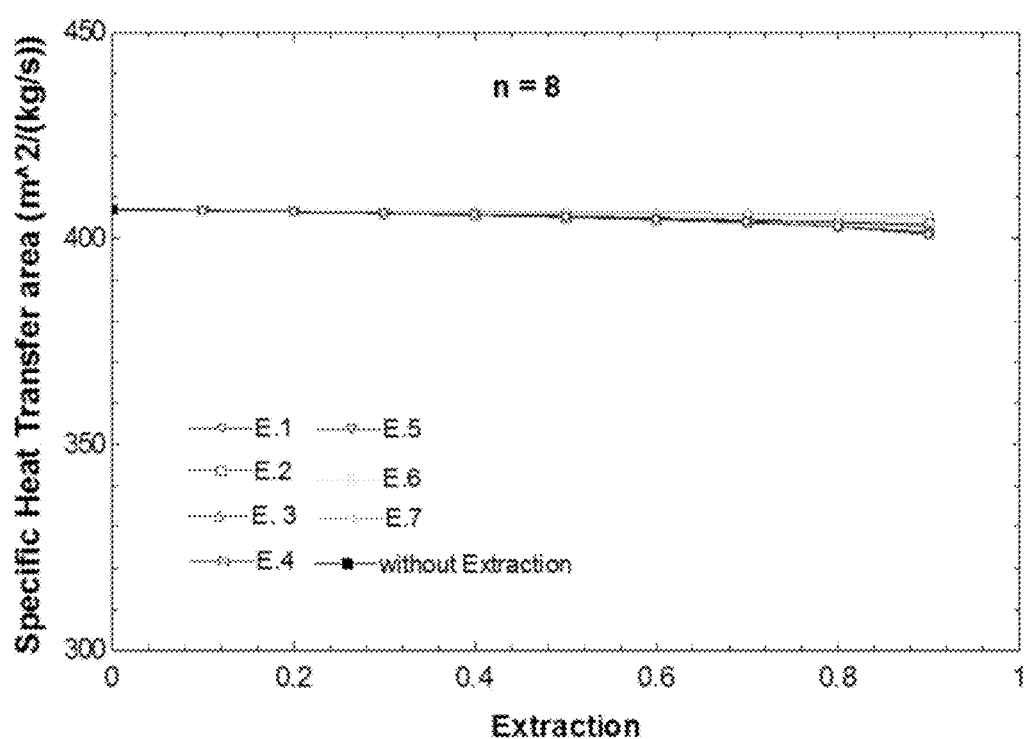
FIG. 3B represents a specific heat transfer area of a desalination system versus an extraction ratio of the secondary compressor, wherein the desalination system contains eight evaporators that are fluidly connected in series with a parallel feed configuration.

In another embodiment, the evaporators are fluidly connected in series with a parallel feed configuration as shown in FIGS. 1C and 1F, wherein the saline water line 130 supplies the saline water 130s to each of the evaporators, and wherein the brine outlet 112 of each evaporator is fluidly connected to the brine line 134 to discharge the brine 134s that is accumulated in the interior of the evaporators. In the parallel feed configuration, the evaporators are fluidly connected in parallel, as shown in FIGS. 1C and 1F. In one embodiment, a specific heat transfer area of the desalination system 100 that includes eight evaporators that are fluidly connected in series with a parallel feed configuration may vary in the range from about 300 m²/(kg/s) to about 500 m²/(kg/s), preferably about 350 m²/(kg/s) to about 450 m²/(kg/s), preferably about 400 m²/(kg/s) to about 430 m²/(kg/s), as shown in FIG. 3B.

Figure 1G:
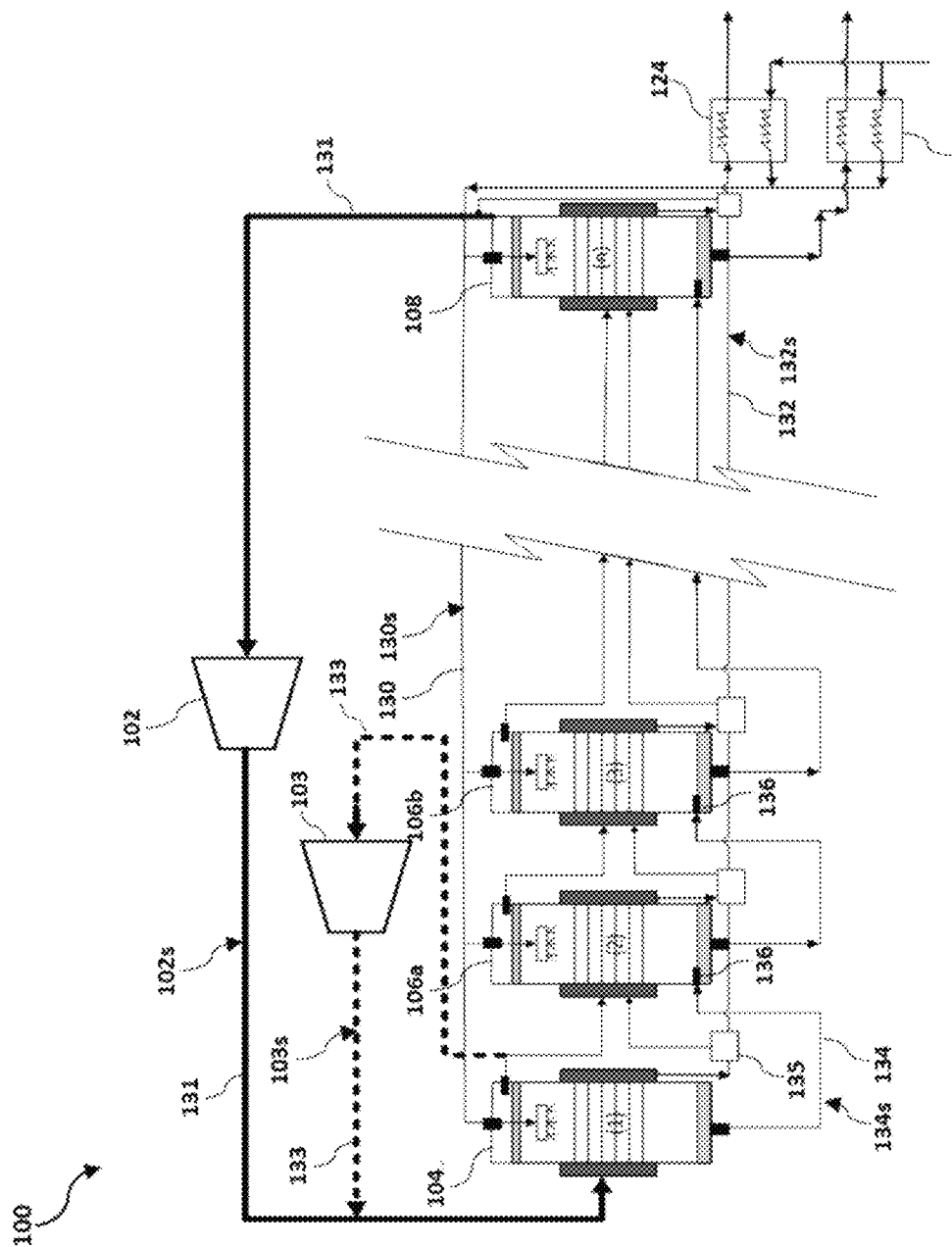
FIG. 1G illustrates a desalination system with a primary compressor, a secondary compressor, and a plurality of evaporators that are fluidly connected in series with a parallel/cross feed configuration.
Figure 1H:
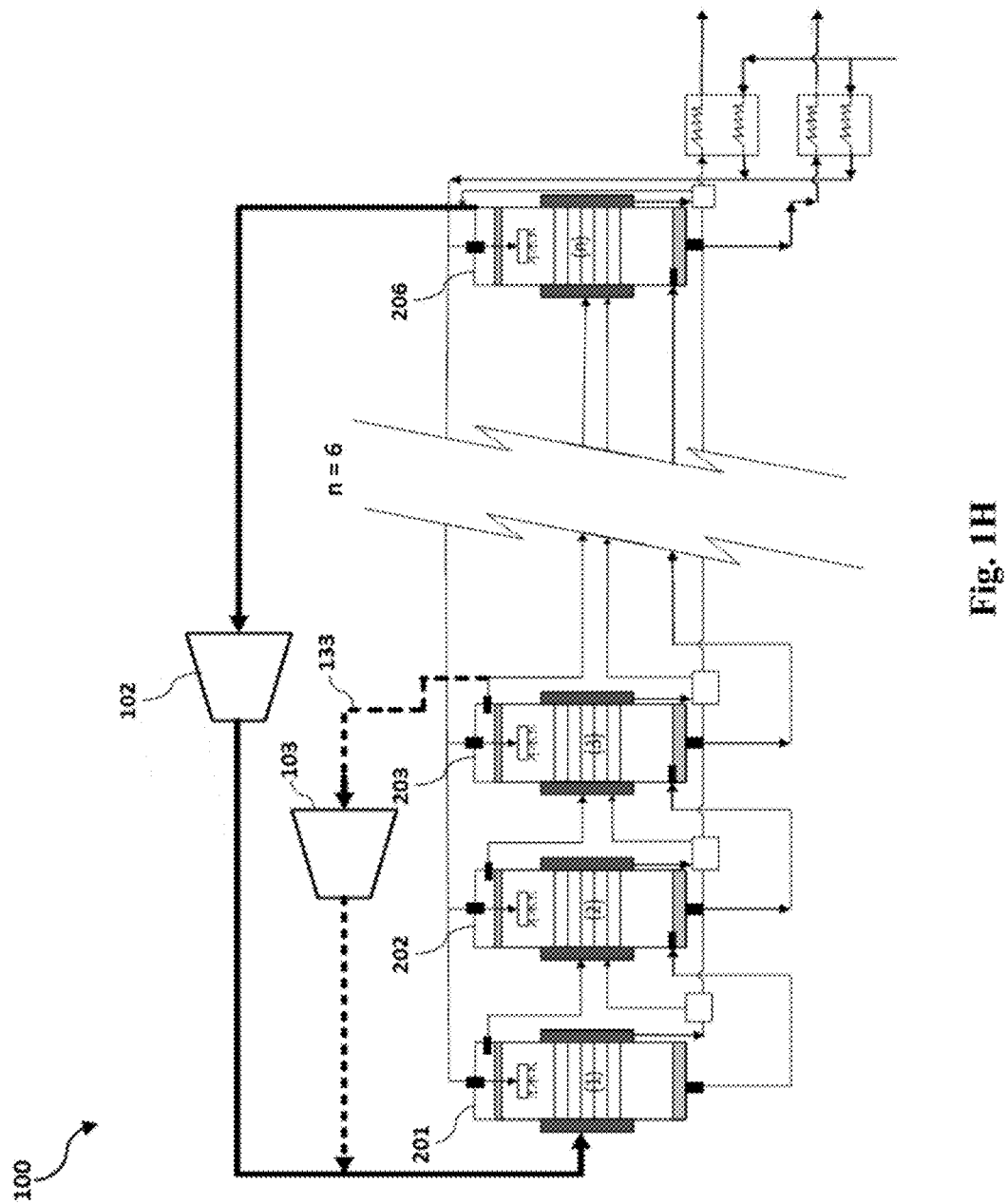
FIG. 1H illustrates an alternative embodiment of the desalination system with a primary compressor, a secondary compressor, and six evaporators that are fluidly connected in series with a parallel/cross feed configuration.
Figure 3C:
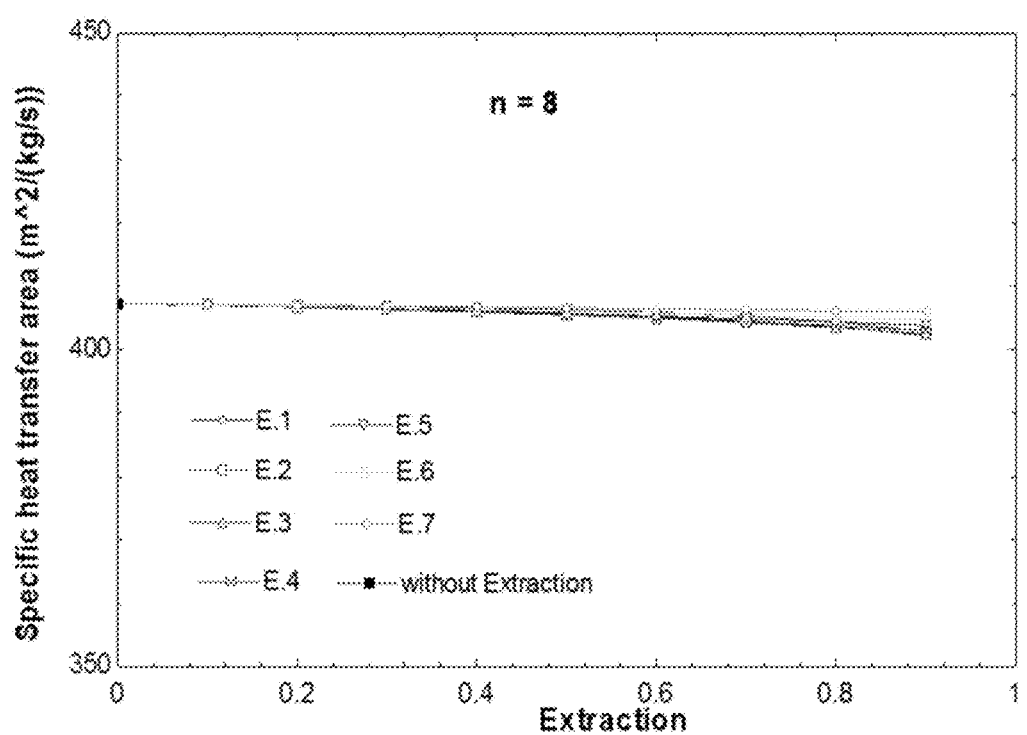
FIG. 3C represents a specific heat transfer area of a desalination system versus an extraction ratio of the secondary compressor, wherein the desalination system contains eight evaporators that are fluidly connected in series with a parallel/cross feed configuration.

Yet in another embodiment, the evaporators are fluidly connected in series with a parallel/cross feed configuration as shown in FIGS. 1D, 1G, and 1H, wherein the brine outlet 112 of each evaporator is fluidly connected to a brine line 136 of the subsequent evaporator. The brine line 136 is preferably may be located proximal to the bottom of each evaporator. Accordingly, the brine 134s that is accumulated in each evaporator is further delivered to the bottom of the subsequent evaporator, which is operated at a lower internal pressure, wherein a portion of the brine 134s may turn into vapor, and thus an overall vapor production of the evaporator may increase. As a result, an overall efficiency of the desalination system 100 may be increased as well. In one embodiment, a specific heat transfer area of the desalination system 100 that includes eight evaporators that are fluidly connected in series with a parallel/cross feed configuration may vary in the range from about 300 m²/(kg/s) to about 500 m²/(kg/s), preferably about 350 m²/(kg/s) to about 450 m²/(kg/s), preferably about 400 m²/(kg/s) to about 430 m²/(kg/s), as shown in FIG. 3C.

A thermal energy for running the desalination system 100 is supplied by the compressed vapor 102s that is provided by the primary compressor 102. The primary compressor 102 is located downstream of the last evaporator 108 and is fluidly connected to the vapor outlet 129 of the last evaporator 108 via the vapor line 131. In addition, the primary compressor 102 is located upstream of the first evaporator 104 and is fluidly connected to the tube inlet of the first evaporator 104. In view of that, the primary compressor 102 draws the vapor from the interior of the last evaporator 108 and delivers the compressed vapor 102s to the tube of the first evaporator 104.

The primary compressor 102 may be a positive displacement type, e.g. a reciprocating compressor or a rotary compressor, or a dynamic type, e.g. a centrifugal compressor or an axial-flow compressor. The type of the primary compressor 102 is not meant to be limiting and various other types of compressor may also be used, e.g. diagonal compressors, scroll compressors, diaphragm compressors, etc. A pressure ratio of the primary compressor 102 may vary in the range from about 1.1 to 3, preferably 1.2 to 2.5. preferably 1.2 to 20, preferably 1.3 to 10. According to the pressure ratios, a capacity of the primary compressor 102 may vary in the range from about 1 CFM (cubic feet per minute) to about 1,000 CFM, preferably 10 to about 500 CFM, preferably about 50 to about 300 CFM. A power consumption of the primary compressor 102 depends on the pressure ratio and the capacity. Preferably, in one embodiment, the primary compressor 102 is operated at a pressure ratio of 8 to 12, preferably about 10, with a capacity of 1 to 100 CFM, preferably about 10 CFM, wherein the power consumption of the primary compressor 102 ranges from 5 to 15 kWh, preferably about 10 kWh.-As used in this disclosure, the "pressure ratio" of a compressor refers to a ratio of the pressure of a vapor at the discharge side of the compressor to a pressure of the vapor at the suction side of the compressor. Also, the "capacity" of a compressor refers to a volumetric flow rate of a compressed vapor that is produced by the compressor at a predetermined pressure ratio. Furthermore, the "power consumption" of a compressor refers to the amount of power that is consumed by the compressor, and it is preferably measured at a predetermined pressure ratio and a predetermined capacity.

In some embodiments, the vapor before entering the primary compressor 102, i.e. the vapor that is extracted from the interior of the last evaporator 108, may have a temperature in the range of 50 to 110° C., preferably 60 to 100° C., preferably 70 to 95° C., and a pressure of less than 1.0 bar, preferably in the range of 0.3 to 0.6, preferably 0.4 to 0.5 bars, whereas the compressed vapor 102s may have a temperature of 80 to 200° C., preferably 100 to 180° C., preferably 120 to 150° C., and a pressure in the range of 1.2 to 10 bars, preferably 1.5 to 8.0 bars, preferably 2.0 to 5.0 bars.

In addition to the primary compressor 102, the desalination system 100 further includes the secondary compressor 103, which is utilized to substantially increase a production rate of the water condensate 132s. The secondary compressor 103 extracts a portion of vapor that is formed in the first evaporator 104 and/or the at least one intermediate evaporator (i.e. 106a, 106b, . . . ), compresses the vapor to form a second compressed vapor 103s, and delivers the second compressed vapor 103s along with the compressed vapor 102s to the tube of the first evaporator 104. Preferably, a pressure of the second compressed vapor 103s is substantially the same as the pressure of the compressed vapor 102s. In some embodiments, the compressed vapor 102s and the second compressed vapor 103s are separately delivered to the inlet plenum 118, wherein the pressure of the compressed vapor 102s is different than the pressure of the second compressed vapor 103s.

As a result of an increase in the volumetric flow rate of the vapor that enters the tube of the first evaporator 104, thermal energy that is provided to the first evaporator 104 may subsequently rise, and thus more vapor may form in the first evaporator 104, when compared to the embodiments where the secondary compressor 103 does not exist. As a result of more vapor production in the first evaporator 104, a specific power consumption of the desalination system 100 is reduced, when compared to the embodiments where the secondary compressor 103 does not exist. The term "specific power consumption" refers to a ratio of the amount of power consumed by the primary compressor 102 and the secondary compressor 103 (in kWh) to the amount of water condensate 132s formed by the desalination system 100 (in cubic meter). The specific power consumption of the desalination system 100 with different number of evaporators (n) and various configurations are shown in FIGS. 2A, 2B, 2C, and 2D.

The secondary compressor 103 is disposed in the desalination system such that the suction side of the secondary compressor 103 is fluidly connected to the vapor outlet 129 of the first evaporator 104 and/or the vapor outlet of at least one intermediate evaporator (i.e. 106a, 106b, . . . ), wherein the secondary compressor 103 extracts vapor therefrom. Additionally, the discharge side of the secondary compressor 103 is fluidly connected to the tube inlet of the first evaporator 104 to deliver the second compressed vapor 103s to the tube inlet of the first evaporator 104. In some embodiments, a gas mixer may be located upstream of the tube inlet of the first evaporator 104, wherein the compressed vapor 102s and the second compressed vapor 103s are mixed before entering the tube inlet of the first evaporator 104.

Although the discharge side of the secondary compressor 103 may preferably be fluidly connected to the tube inlet of the first evaporator 104, the suction side of the secondary compressor 103 may be fluidly connected to one or more of the vapor outlets. For example, in some embodiments, the suction side of the secondary compressor 103 is fluidly connected to the vapor outlet of the first evaporator 104, as shown in FIGS. 1E, 1F, and 1G. In some alternative embodiments, the suction side of the secondary compressor 103 is fluidly connected to the vapor outlet of at least one intermediate evaporator, as shown in FIG. 1H. Yet in some embodiments, the suction side of the secondary compressor 103 is fluidly connected to the vapor outlet of the first evaporator 104 and at least one intermediate evaporator (i.e. 106a, 106b . . . ). In view of these embodiments, the primary compressor 102 and the secondary compressor 103 may preferably be fluidly connected to the tube inlet of the first evaporator 104 in parallel.

The discharge side of the secondary compressor 103 may be fluidly connected to the tube inlet of one of the intermediate evaporators (i.e. 106a, 106b . . . ). Various combinations of embodiments are disclosed here, wherein the discharge side of the secondary compressor 103 may be connected to the tube inlet of any evaporators in the desalination system 100, whereas the suction side of the secondary compressor 103 may be connected to the vapor outlet 129 of any evaporators in the desalination system 100.

Referring to FIG. 1H, in one preferred embodiment, the desalination system 100 includes six evaporators (n=6), i.e. a primary evaporator 201 (or a first evaporator), a secondary evaporator 202 (or a second evaporator), a tertiary evaporator 203 (or a third evaporator), a quaternary evaporator (or a fourth evaporator, not shown in FIG. 1H), a quinary evaporator (or a fifth evaporator, not shown in FIG. 1H), and a senary evaporator (or a sixth evaporator, not shown in FIG. 1H) that are fluidly connected in series with a parallel/cross feed configuration. Accordingly, the suction side of the secondary compressor 103 is fluidly connected to the vapor outlet of the tertiary evaporator 203, and the discharge side of the secondary compressor 103 is fluidly connected to the tube inlet of the primary evaporator 201.

In one embodiment, the desalination system 100 includes N evaporators, wherein the secondary compressor 103 is fluidly connected to the vapor outlet of an evaporator that is located at a position of N/2. N is defined as a non-zero positive integer, which may be an odd number or preferably an even number. For example, in one embodiment, the desalination system 100 includes 10 evaporators (i.e. N is equal to 10), wherein the secondary compressor 103 is fluidly connected to the vapor outlet of a fifth evaporator (i.e. 10/2) in the series. In the embodiments where N is an odd number, the secondary compressor 103 may be fluidly connected to the vapor outlet of an evaporator that is defined by (N+1)/2 in the series. For example, in one embodiment, the desalination system 100 includes 7 evaporators (i.e. N is equal to 7), wherein the secondary compressor 103 is fluidly connected to the vapor outlet of a fourth evaporator (i.e. (7+1)/2) in the series.

The secondary compressor 103 may be a positive displacement type, e.g. a reciprocating compressor or a rotary compressor, or a dynamic type, e.g. a centrifugal compressor or an axial-flow compressor. The type of the secondary compressor 103 is not meant to be limiting and various other types of compressor may also be used, e.g. diagonal compressors, scroll compressors, diaphragm compressors, etc. A pressure ratio of the secondary compressor 103 may vary in the range from about 1.1 to 10, preferably 1.2 to 8, preferably 1.3 to 6. According to the pressure ratios, a capacity of the secondary compressor 103 may vary in the range from about 1 CFM (cubic feet per minute) to about 1,000 CFM, preferably 10 to about 500 CFM, preferably about 50 to about 300 CFM. A power consumption of the secondary compressor 103 depends on the pressure ratio and the capacity. Preferably, in one embodiment, the secondary compressor 103 is operated at a pressure ratio of 1.5 to 8, preferably about 2, with a capacity of 1 to 100 CFM, preferably about 10 CFM, wherein the power consumption of the secondary compressor 103 ranges from 5 to 15 kWh, preferably about 10 kWh.

The presence of the secondary compressor 103 may not affect the specific heat transfer of the desalination system 100, thus the desalination system may have a specific heat transfer area that is substantially the same as the specific heat transfer area of a desalination system that does not include the secondary compressor. For example, in one embodiment, the desalination system 100 has a secondary compressor 103, wherein a specific heat transfer area of the desalination system 100 is in the range of 400 m²/(kg/s) to about 900 m²/(kg/s), preferably about 600 m²/(kg/s) to about 800 m²/(kg/s), which is substantially the same as the specific heat transfer area of a desalination system that does not include the secondary compressor 103.

The primary compressor 102 and/or the secondary compressor 103 may be powered by various means known to those skilled in the art. For example, in some embodiments, the primary compressor 102 and/or the secondary compressor 103 may be powered by one or more drive motors selected from the group consisting of gas turbines, steam turbines, water turbines, electric motors, and diesel engines.

In some preferred embodiments, the primary compressor 102 and/or the secondary compressor 103 may be powered by solar energy. Accordingly, solar energy operates a vapor generator and subsequently a steam turbine that may further rotate a shaft of the primary compressor 102 and/or the secondary compressor 103. Alternatively, the steam turbine may operate a generator to produce electricity, and the electricity may further be utilized to run the primary compressor 102 and/or the secondary compressor 103. In some embodiments, concentrated solar towers may be utilized to power the primary and/or the secondary compressor 103, wherein a hot and a cold storage tank and a molten salt, as a heat transfer fluid, may be used to store thermal energy during night hours.

Yet in some embodiments, solar energy powers an electric drive motor of the primary compressor 102 and/or the secondary compressor 103, e.g. by means of photovoltaic solar cells. Then, the drive motor runs the primary compressor 102 and/or the secondary compressor 103. Using solar energy to run the primary compressor 102 and/or the secondary compressor 103 may be more advantageous for remote areas, e.g. islands, deserts, remote villages, etc. where solar radiation is abundant and freshwater is not easily accessible. In addition, using solar energy may enable one to manufacture compact desalination systems 100, e.g. in the size of pilot plants or smaller, for desalination purposes in the remote areas, where a power plant is not accessible.

The desalination system of this disclosure does not include a condenser, thus making it more economical than comparable thermal vapor compression systems. The desalination system of the present disclosure is less bulky and may possess a higher coefficient of performance than systems employing comparable alternative technologies.

In one embodiment, an extraction ratio of the secondary compressor 103 ranges from 0.05 to 0.95, preferably 0.1 to 0.9, preferably 0.15 to 0.85, wherein a specific power consumption of the desalination system 100 ranges from 4.0 to 16 kWh, preferably 5 to 15 kWh, preferably about 10 kWh per one cubic meter of the water condensate 132s formed. In a preferred embodiment, an extraction ratio of the secondary compressor 103 ranges from 0.4 to 0.9, preferably 0.5 to 0.8, wherein a specific power consumption of the desalination system 100 ranges from 5 to 12 kWh, preferably 6 to 10 kWh, preferably about 7 to 8 kWh per one cubic meter of the water condensate 132s formed. The specific power consumption of the desalination system 100 may be decreased by increasing the extraction ratio of the secondary compressor 103, thus a performance ratio of the desalination system 100 may be increased by at least 5%, preferably 10% to 30%. The term "extraction ratio" as used herein refers to a volumetric ratio of the vapor that is extracted by the secondary compressor 103 to the total volume of the vapor that is formed in the evaporator, which the vapor is extracted therefrom. The presence of the secondary compressor 103 reduces the specific power consumption of the desalination system 100 by at least 10%, preferably at least 20%, preferably at least 30%, preferably at least 40%, preferably at least 50%, or preferably at least 80%.

Figure 4:
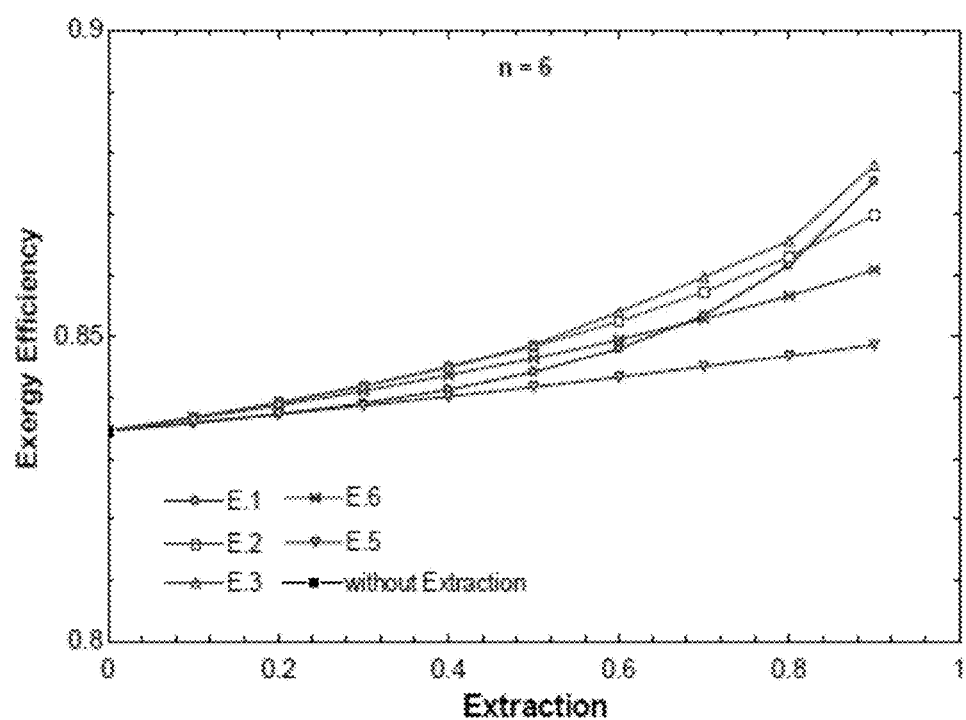
FIG. 4 represents an exergy efficiency of a desalination system versus an extraction ratio of the secondary compressor, wherein the desalination system contains six evaporators that are fluidly connected in series with a parallel feed configuration.

In one embodiment, an extraction ratio of the secondary compressor 103 ranges from 0.05 to 0.95, preferably 0.1 to 0.9, preferably 0.15 to 0.85, wherein an exergy efficiency of the desalination system 100 ranges from 75% to 95%, preferably 80% to 92%, preferably 82% to 90%, as shown in FIG. 4. The presence of the secondary compressor 103 may increase an exergy efficiency of the desalination system 100 by at least 10%, preferably 20% to 80%, preferably 30% to 70%, relative to a desalination system that does not include a secondary compressor. In a preferred embodiment, the desalination system 100 includes N evaporators, and the secondary compressor 103 is fluidly connected to the vapor outlet of an evaporator that is located at a position of N/2, wherein an exergy efficiency of the desalination system may be increased by at least 50%, preferably 60% to 90%, preferably 70% to 80%, relative to a desalination system that does not include a secondary compressor. In some embodiments, the exergy efficiency of the desalination system 100 may be increased by increasing the extraction ratio of the secondary compressor 103, thus a performance ratio of the desalination system 100 may be increased by at least 5%, preferably 10% to 30%. The term "exergy efficiency" as used herein refers to an efficiency of a system when compared to a thermodynamically perfect system, as defined by the second law of thermodynamics, under substantially the same conditions.

A production capacity of the desalination system 100 may vary according to the size of the desalination system. The term "production capacity" as used herein refers to a production rate of the water condensate 132s that is produced by the desalination system. For small scale desalination systems, the production capacity may be in the range of 0.01 to 50 m³/d (cubic meters per day), preferably 0.5 to 40 m³/d, preferably 1.0 to 30 m³/d. For pilot-scale (medium scale) desalination systems, the production capacity may be in the range of 50 to 500 m³/d, preferably 60 to 450 m³/d, preferably 70 to 400 m³/d. For industrial-scale desalination systems, the production capacity may be in the range of 100 to 50,000 m³/d, preferably 500 to 20,000 m³/d, preferably 1,000 to 10,000 m³/d.

The examples below are intended to further illustrate protocols for the desalination system, and are not intended to limit the scope of the claims.

Example 1

MED-MVC parallel feed is a thermal desalination process (as shown in FIGS. 1C and 1F); the saline water (feed water) is sprinkled or otherwise spread onto the surface area of the effect (evaporator) surface (ordinarily horizontal tubes). The tubes in the evaporator of the first effect are heated by steam compressed in the mechanical vapor compressor. The vapor produced at the first effect is condensed in the tubes of the second effect, where again vapor is created. The other effects are heated by vapor created in each previous effect. Each effect has a lower temperature and pressure compared to the previous one. The vapor created in the last effect is compressed in the mechanical vapor compressor to superheated condition before it enters to the tubes of the first effect as the heating fluid.

FIG. 1F shows the modified MED-MVC system with a parallel feed arrangement that includes a secondary compressor. The secondary compressor receives a portion of the vapor formed in one of the other effects (1 to n-1) and compresses it to the same state of the vapor leaving the main compressor. Both vapor streams are mixed together before they flow to the tubes of the first effect to preheat the sprayed seawater on the outer surface of the tubes and evaporate some of it. Although the layout shown in FIG. 1F illustrates connection of the secondary compressor to the exit of the first effect, alternative embodiments are disclosed here, wherein the secondary compressor is connected to other evaporators.

Example 2—Parallel Feed MED-MVC

Figure 2A:
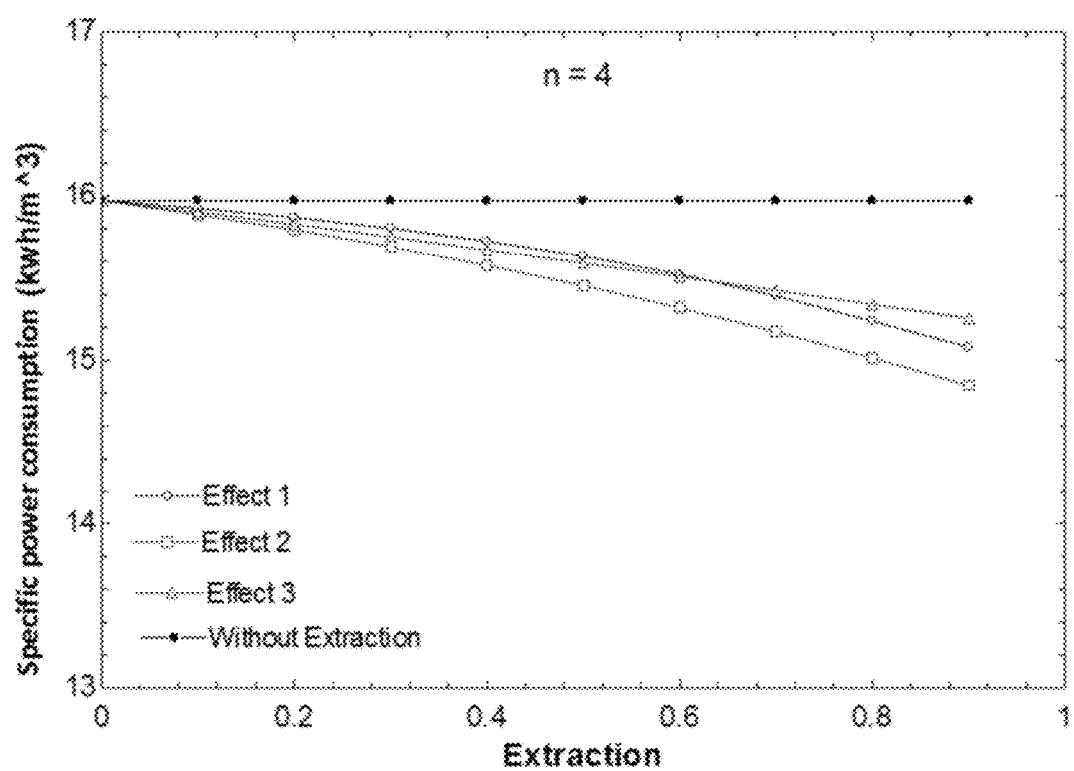
FIG. 2A represents a specific power consumption of a desalination system versus an extraction ratio of the secondary compressor, wherein the desalination system contains four evaporators that are fluidly connected in series with a forward feed configuration.
Figure 2B:
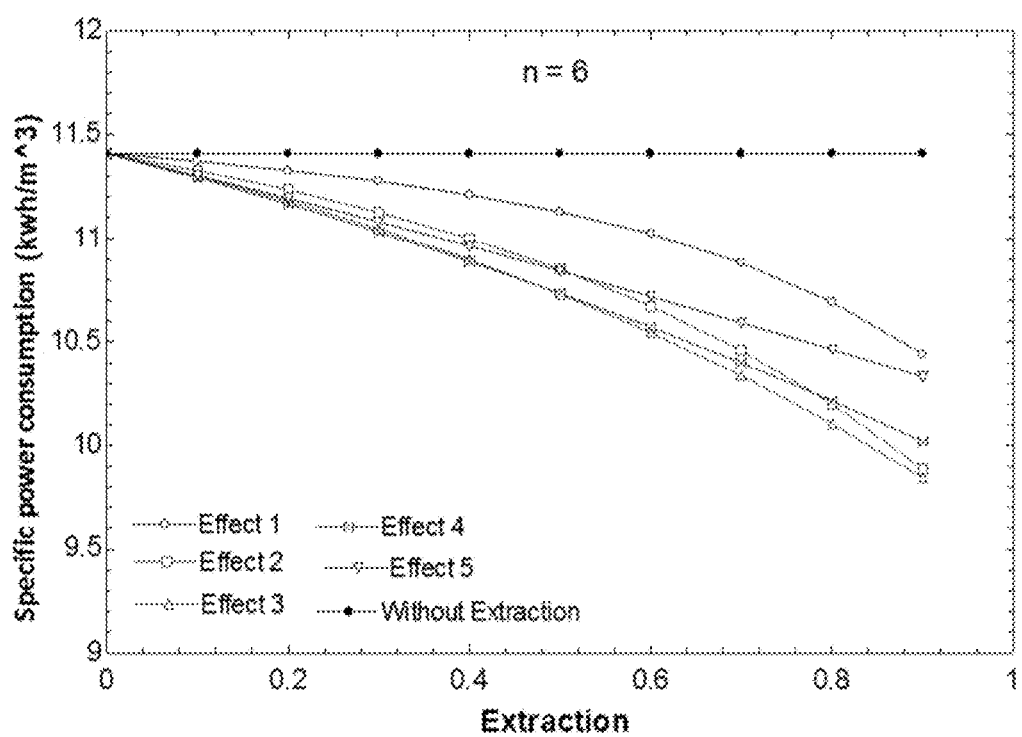
FIG. 2B represents a specific power consumption of a desalination system versus an extraction ratio of the secondary compressor, wherein the desalination system contains six evaporators that are fluidly connected in series with a forward feed configuration.
Figure 2C:
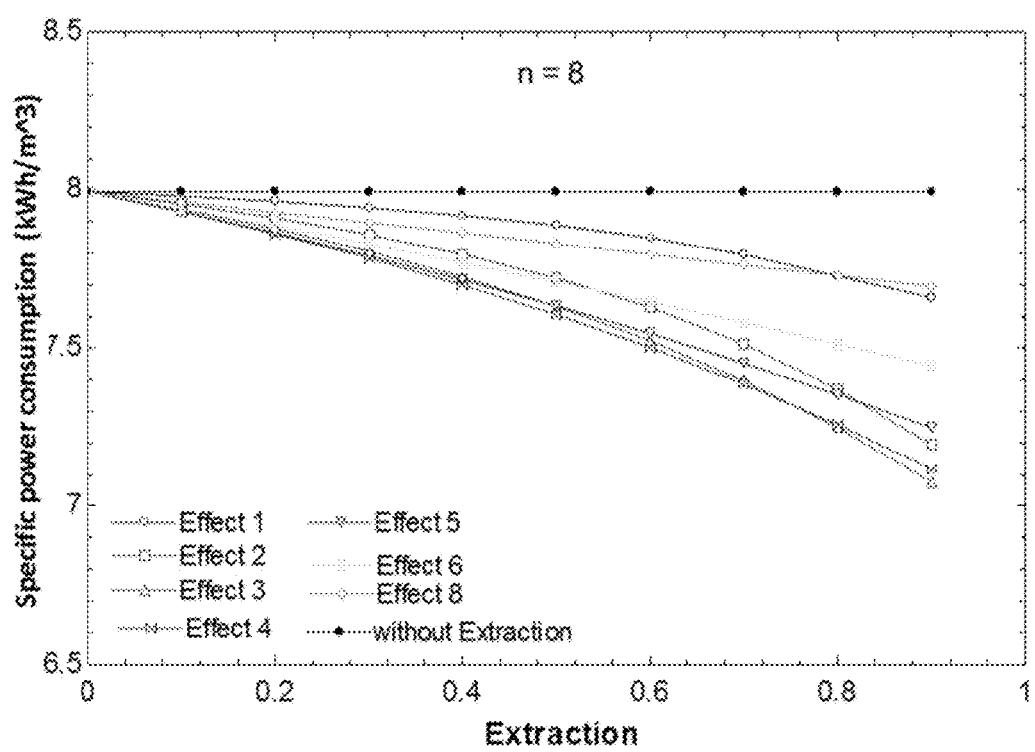
FIG. 2C represents a specific power consumption of a desalination system versus an extraction ratio of the secondary compressor, wherein the desalination system contains eight evaporators that are fluidly connected in series with a forward feed configuration.
Figure 2D:
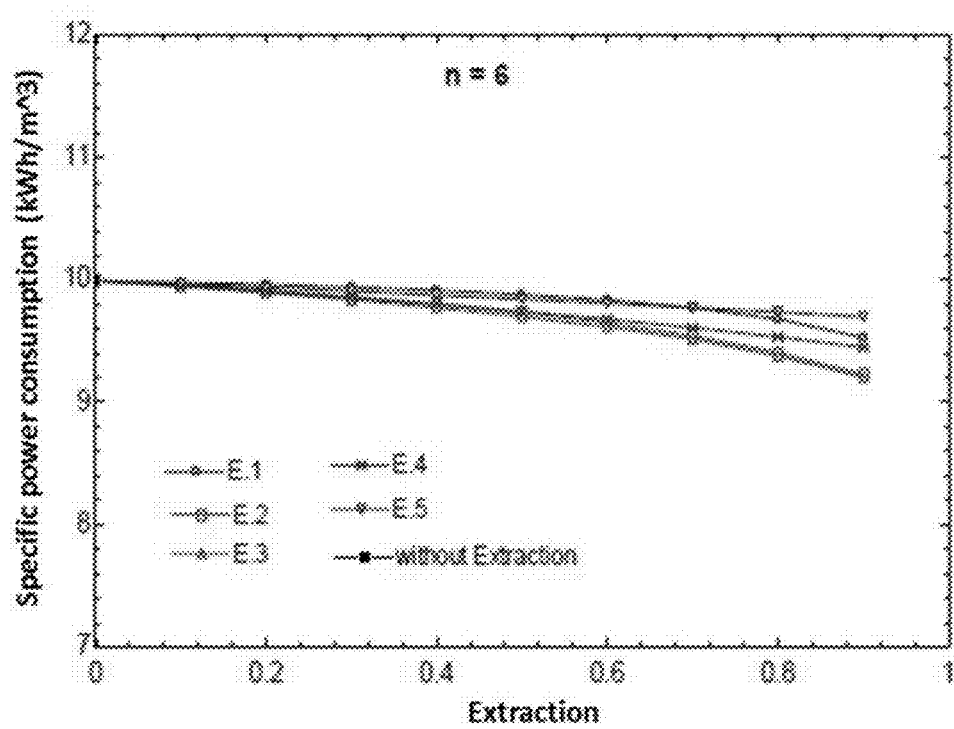
FIG. 2D represents a specific power consumption of a desalination system versus an extraction ratio of the secondary compressor, wherein the desalination system contains six evaporators that are fluidly connected in series with a parallel feed configuration.

FIG. 2D shows the variation of the specific power of the system with the extracted vapor entering the secondary compressor compared to the original case of no secondary compressor for systems of 6 effects. The specific power decreases with the increase in extraction rate because of the increase in the rate of steam that enters the first effect as a result of combined flow rates from both compressors. This, in turn, results in an increased rate of evaporation of sprayed seawater in the first effect and results in more formed vapor in all effects and accordingly higher productivity or in other words, less power to produce a unit desalinated water flow rate. The decrease in the vapor specific volume at higher operating temperature also contributes to reduction in the specific power for vapor compression. The increase in the specific power consumption corresponds to systems of lower number of effects. Thus, a general observation is made that lower values of the specific power are at a higher value of extraction occurs in the effect (n/2) for this system as well as for others of 4 and 8 effects that could not be presented due to the space limitation.

Early extraction decreases the rate of vapor formed in the last effect and accordingly decreases its associated compressor power. In circumstances where a higher amount of vapor flows into the secondary compressor, less power is needed due to the decreased compression ratio. Thus, a general observation is made that lower values of the specific power correspond to a higher value of extraction that occurs in the effect (n/2). The vapor extracted after the first effect has the lowest pressure ratio.

Figure 5:
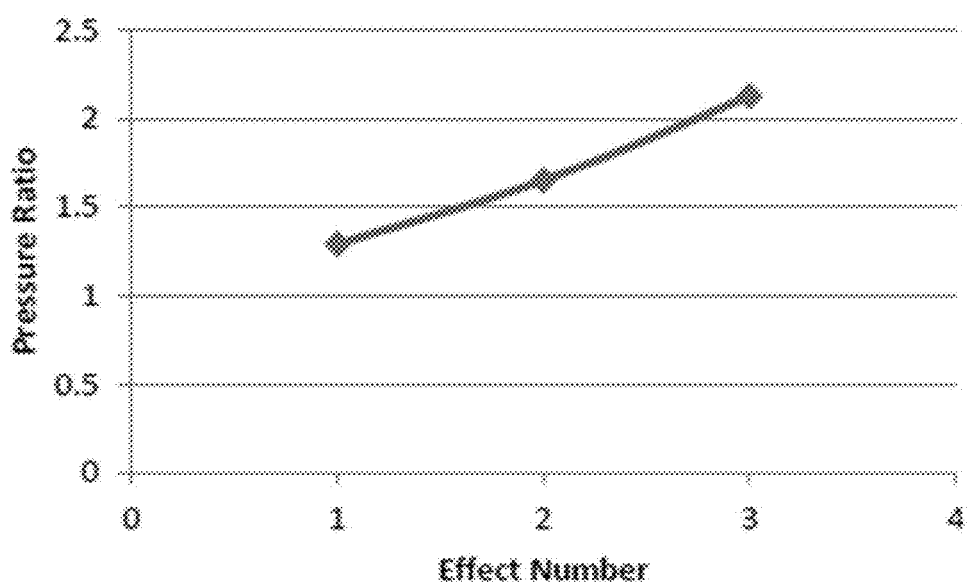
FIG. 5 represents a pressure ratio of the secondary compressor in a desalination system that contains four effects that are fluidly connected in series with a parallel feed configuration, wherein a suction side of the secondary compressor is fluidly connected to a vapor outlet of effect 1, effect 2, or effect 3.

FIG. 5 shows the increase in the pressure ratio that corresponds to the relocation of the secondary compressor to receive formed vapor from effects 1, 2 and 3 for a 4-effect system. The pressure ratio increases as the extraction point is delayed to later effects due to the monotonic decrease in pressure as the vapor flows from on effect to the other to maintain evaporation in all effects while the first effect is at the maximum pressure and temperature.

Specific heat transfer area is the sum of the total area of the system per distillate flow rate. The specific heat transfer area in MED-MVC parallel feed is dependent on distillate rate per effect as well as the latent heat of condensation at the temperature at which the vapor leaves the effect as well as feed water per effect and the number of effects.

Figure 3D:
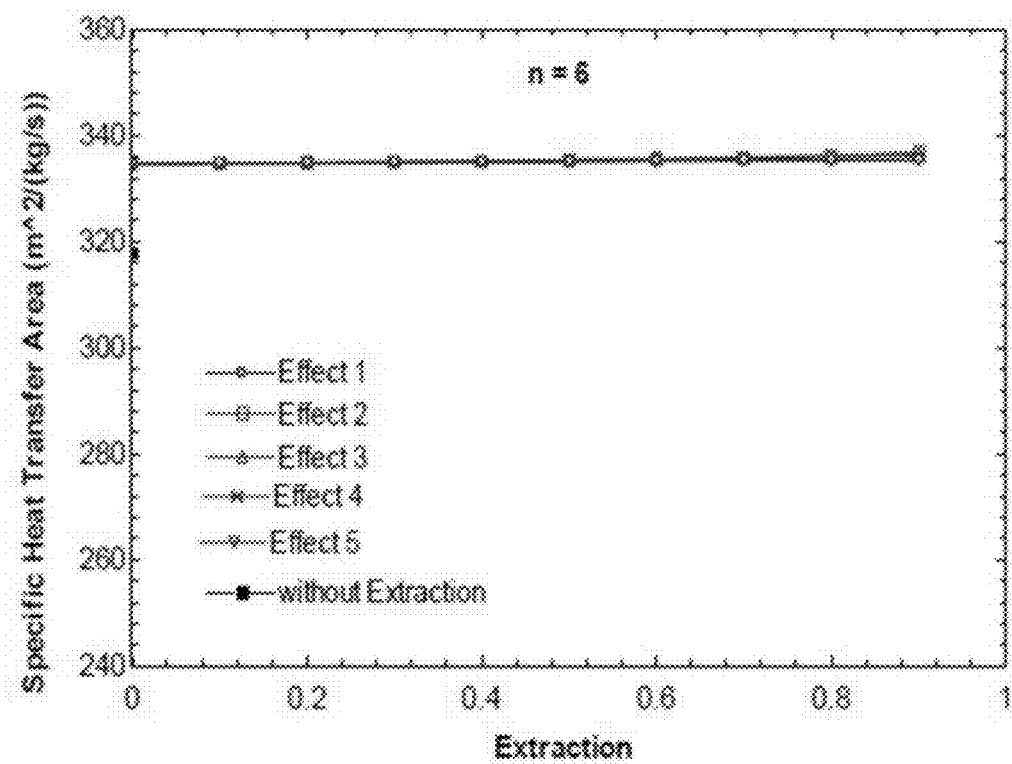
FIG. 3D represents a specific heat transfer area of a desalination system versus an extraction ratio of the secondary compressor, wherein the desalination system contains six evaporators that are fluidly connected in series with a parallel feed configuration.

FIG. 3D shows the variation of the specific heat transfer area of the system with the extracted vapor entering the secondary compressor compared with the original case of no secondary compressor for systems of 6 effects. The figure shows that the specific heat transfer area (sA) is independent of extraction rate. When the extraction of formed vapor to the secondary compressors occurs at any effect, the specific heat transfer area is constant due to the low latent heat (corresponding to maximum temperature) as well as the decrease of the both distillate flow rate and feed water rate that flows to the next effects. The specific heat transfer area for the effect is slightly higher than its previous effect at the same extraction because of the decrease in the temperature of the vapor formed in the effect where extraction of vapor occurs.

FIG. 4 shows that the exergy efficiency increases with increased extraction percentage. It was observed that higher exergy efficiency occurs when vapor is extracted at the middle location of the extraction (n=3). This result is consistent with the previous results that show superior performance in terms of specific power at higher extraction percentage and for extraction occurring at the middle effect.

Performance improvement of the MED-MVC-PF desalination system has been realized through the addition of a secondary compressor to the system. The decrease in the vapor specific volume at higher operating temperature also contributes to reduction in the specific power for vapor compression. Parallel feed-multi effect desalination system with mechanical vapor compression, using a secondary compressor that draws formed vapor from a middle effect (n/2) revealed the best performance among other configurations.

The vapor extracted after the first effect has the lowest pressure ratio whereas its mass vapor entering the second compressor is the highest with the extraction percentage, and the vapor extracted after effect (n-1) has the highest pressure ratio whereas its mass vapor is the lowest. Therefore, the preferable case is to extract the vapor after the effect (n/2). The extraction rate has insignificant effect on the specific heat transfer area, and the exergy efficiency increases with the extraction rate to increased flow to the secondary compressor.

Example 3—Forward Feed MED-MVC

A secondary compressor was also applied to the original layout of a forward feed arrangement of an MED-MVC system. The secondary compressor extracts a portion of the formed vapor from one of the effects, compresses it to the state of the vapor entering to the first effect, mixing it with the inlet vapor to the first effect to enhance the heat transfer (and accordingly, evaporation rate) in the first effect. The layout is depicted in FIG. 1E.

The second compressor received a portion of the vapor formed in one of the effects and compresses it to the same condition of the vapor leaving the main compressor. Both vapor streams are mixed together before they flow to the tubes of the first effect to preheat the sprayed seawater on the outer surface of the tubes and evaporate some of it. This way, the amount of vapor entering the tube of the first effect increases, thus increasing the energy added to the first effect, that in turn results in more vapor formed in this effect. More water vapor condenses to produce more desalinated water with a little expense of increased power due to the addition of the secondary compressor. As a result, the specific power consumption of the system is reduced.

Example 4—Parallel/Cross Feed MED-MVC

The concept of using the secondary compressor was also applied to the original layout of the parallel-cross feed arrangement of MED-MVC systems. FIGS. 1G and 1H show the modified MED-MVC systems with parallel-cross feed arrangement. The addition of the secondary compressor was shown to increase the amount of vaper (per unit time)

that enters the first effect. This also increases the formed vapor that is released in the first effect (due to higher energy release from condensing the whole amount of vapor in the tubes of the first effect). As this vapor is delivered to the next effect, it will form more vapor in the next effect and so on. The added power to run the second compressor is utilized to produce more vapor that are condensed. Flash boxes receive the condensed fresh (desalinated) water as it leaves the tube side of each effect. The flash box is set to the pressure of the next effect. In view of that, additional flashed off vapor that leaves the flash box enters the tube of the next effect to help producing more vapor. This way, effective use of energy produced more water vapor and subsequently produced more desalinated water. As a result, the specific power consumption of the system is reduced.

Thus, the foregoing discussion discloses and describes merely exemplary embodiments of the present invention. As will be understood by those skilled in the art, the present invention may be embodied in other specific forms without departing from the spirit or essential characteristics thereof. Accordingly, the disclosure of the present invention is intended to be illustrative, but not limiting of the scope of the invention, as well as other claims. The disclosure, including any readily discernible variants of the teachings herein, defines, in part, the scope of the foregoing claim terminology such that no inventive subject matter is dedicated to the public.

The invention claimed is:

1. A vapor compression desalination system for seawater, comprising:
    a plurality of evaporators that are fluidly connected in series, with a number of evaporators being from 3 to 12, wherein each evaporator comprises
        a tube with a tube inlet and a tube outlet, wherein at least a portion of the tube is located in an interior of the evaporator,
        a saline water inlet to deliver a saline water to the interior of the evaporator, wherein the saline water is contacted with the tube thereby forming water condensate inside the tube and concurrently forming vapor and brine in the interior of the evaporator,
        a vapor outlet to reject the vapor from the interior of the evaporator,
        a brine outlet to reject the brine from the interior of the evaporator, and
        a vapor line that fluidly connects the vapor outlet to the tube inlet of a subsequent evaporator or a compressor;
    a saline water line that is fluidly connected to the saline water inlet of at least one evaporator, wherein the saline water line delivers the saline water to the saline water inlet;
    a distillate line that is fluidly connected to the tube outlet of at least one evaporator, wherein the distillate line delivers the water condensate to a downstream unit;
    a primary compressor that is fluidly connected to the vapor outlet of a last evaporator in the series and the tube inlet of a first evaporator in the series, wherein the primary compressor compresses a vapor from the interior of the last evaporator and delivers the vapor to the tube of the first evaporator; and
    a secondary compressor that is fluidly connected to the vapor outlet of the first evaporator and/or the vapor outlet of at least one intermediate evaporator in the series and the tube inlet of the first evaporator, wherein the secondary compressor compresses a vapor from the interior of the first evaporator and/or the at least one intermediate evaporator and delivers the vapor to the tube of the first evaporator,
    wherein the secondary compressor is a positive displacement reciprocating compressor or a positive displacement rotary compressor.

2. The vapor compression desalination system of claim 1, wherein the secondary compressor is fluidly connected to the vapor outlet of the first evaporator and the vapor outlet of the at least one intermediate evaporator and the tube inlet of the first evaporator.

3. The vapor compression desalination system of claim 1, wherein the secondary compressor is fluidly connected to the vapor outlet of the first evaporator and the tube inlet of the first evaporator.

4. The vapor compression desalination system of claim 1, wherein the secondary compressor is fluidly connected to the vapor outlet of an intermediate evaporator and the tube inlet of the first evaporator.

5. The vapor compression desalination system of claim 1, wherein the primary compressor and the secondary compressor are fluidly connected to the tube inlet of the first evaporator in parallel.

6. The vapor compression desalination system of claim 1, wherein a pressure ratio of the secondary compressor is in the range of 1.1 to 3.

7. The vapor compression desalination system of claim 1, further comprising:
    a brine line that is fluidly connected to the brine outlet of at least one evaporator, wherein the brine line discharges the brine.

8. The vapor compression desalination system of claim 1, wherein the evaporators are fluidly connected in series with a parallel feed configuration.

9. The vapor compression desalination system of claim 1, wherein the evaporators are fluidly connected in series with a parallel/cross feed configuration.

10. The vapor compression desalination system of claim 1, wherein the evaporators are fluidly connected in series with a forward feed configuration.

11. The vapor compression desalination system of claim 1, further comprising:
    a first heat exchanger that is located on the distillate line and the saline water line, wherein the first heat exchanger transfers heat from the water condensate to the saline water.

* * * * *